United States Patent [19]

Ohno et al.

[11] Patent Number: 4,641,083
[45] Date of Patent: Feb. 3, 1987

[54] METHOD AND APPARATUS FOR SUPERVISING CHARGES IN BLAST FURNACE USING ELECTROMAGNETIC WAVES

[75] Inventors: Jiro Ohno; Hirokatsu Yashiro, both of Kawasaki, Japan

[73] Assignee: Nippon Steel Corporation, Tokyo, Japan

[21] Appl. No.: 519,245

[22] Filed: Aug. 1, 1983

[30] Foreign Application Priority Data

| Aug. 3, 1982 | [JP] | Japan | 57-135354 |
| Aug. 4, 1982 | [JP] | Japan | 57-135881 |
| Aug. 25, 1982 | [JP] | Japan | 57-147967 |
| Nov. 4, 1982 | [JP] | Japan | 57-193864 |
| Jul. 5, 1983 | [JP] | Japan | 58-121983 |

[51] Int. Cl.$^4$ .................. G01R 27/04; C12B 7/24
[52] U.S. Cl. .................. 324/58.5 B; 324/58.5 A; 75/41; 266/80; 266/44
[58] Field of Search .............. 324/58.5 B, 58.5 A, 324/58 B, 58 A, 58.5 R, 58 R, 334, 337, 338; 75/41, 11; 266/80, 44

[56] References Cited

U.S. PATENT DOCUMENTS

| 3,265,873 | 8/1966 | Sawyer | 324/58.5 A |
| 3,286,163 | 11/1966 | Holser et al. | 324/338 |
| 4,052,666 | 10/1977 | Fletcher et al. | 324/58.5 B |
| 4,122,392 | 10/1978 | Takenuchi et al. | 324/208 |
| 4,197,495 | 4/1980 | Matsui et al. | 324/207 |
| 4,269,397 | 5/1981 | Strimple et al. | 324/58.5 B X |
| 4,408,156 | 10/1983 | Veys | 324/58.5 R |

FOREIGN PATENT DOCUMENTS

645807 11/1950 United Kingdom .
1296659 11/1972 United Kingdom .

OTHER PUBLICATIONS

Soviet Inventions Illustrated-Week E11 821, 909-838, 407, issued 28 Apr. 1982.

Primary Examiner—Reinhard J. Eisenzopf
Assistant Examiner—Jack B. Harvey
Attorney, Agent, or Firm—Cushman, Darby & Cushman

[57] ABSTRACT

A method and apparatus for supervising a descending speed, thickness of a layer, particle size, and so on of charges in a blast furnace. Coke and ore composing the charges are detected by radiating an electromagnetic wave into the blast furnace. An electromagnetic wave can easily pass through coke, but is reflected or scattered by ore.

34 Claims, 56 Drawing Figures

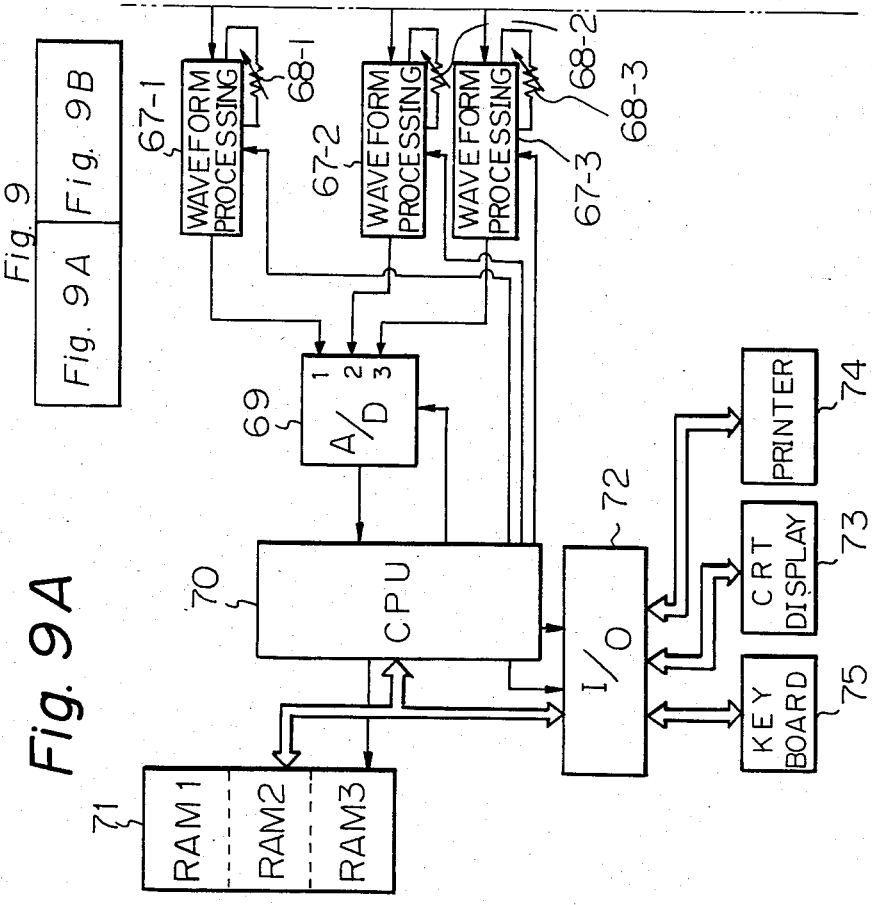

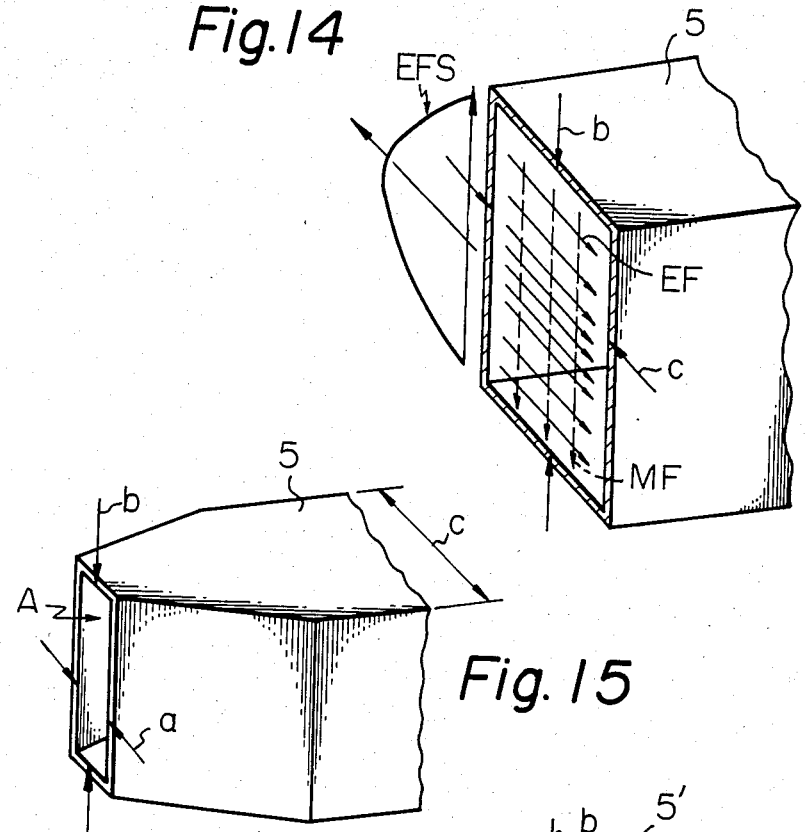
Fig. 14
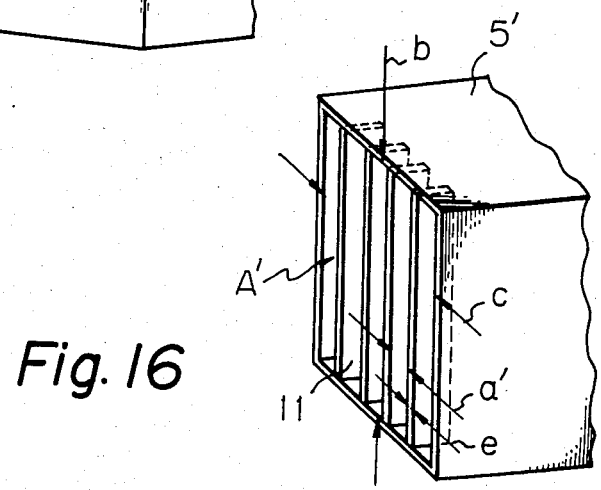
Fig. 15
Fig. 16

← INPUT SIGNAL TO SWITCH 94-1

REFLECTED ELECTROMAGNETIC WAVE SIGNAL
OUTPUT SIGNAL FROM SWITCH 94-1
TRANSMITTED ELECTROMAGNETIC WAVE SIGNAL

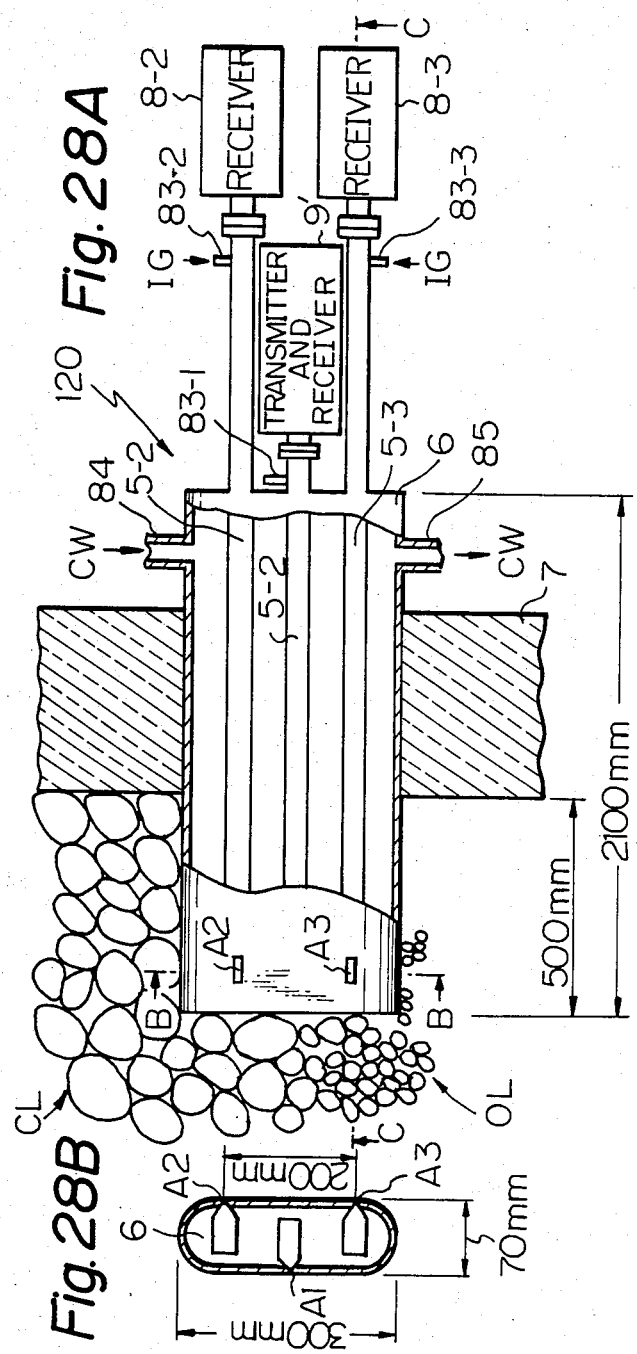

METHOD AND APPARATUS FOR SUPERVISING CHARGES IN BLAST FURNACE USING ELECTROMAGNETIC WAVES

BACKGROUND OF THE INVENTION

1. Field of the Invention

The present invention relates to a method and apparatus for monitoring, i.e. supervising burdens, such as ore and coke, in a blast furnace, located in a high temperature-range portion therein. Here, the term "supervise" means specifically, to detect distribution of burdens, positions of the ore layers, coke layers, the mixture thereof and the layers of the cohesive ore, hereinafter called "cohesive layer", the descending velocity of the burdens and the cohesive layer, the particle size of the ore and coke, the thicknesses of the ore, coke layers and cohesive layers, and so on.

2. Description of the Prior Art

In improving the operation of blast furnaces, it is important to supervise the burdens, especially the burdens located in a high temperature-range portion, i.e., the belly and bosh of the blast furnace.

Several techniques for such supervision have been proposed in the prior art, but these techniques are applicable only to burdens located in a relatively low temperature-range portion, e.g., lower than 400° C., in the furnace. For example, U.S. Pat. No. 4,122,392 proposes to supervise burdens by distinguishing the ore and coke from each other by the difference in magnetic characteristics. Another proposal is to distinguish the ore and coke from each other by detecting the difference in electric resistance.

There are problems, however, with these prior art methods. Magnetic characteristics cannot be measured at temperatures over the Curie point. Also, electrodes for measuring electric resistance deteriorate in conductivity due to the high temperature and as a result of sticking of dusty materials thereto. Thus, the prior art methods are effective only in the low temperature range. Accordingly, it is impossible to supervise the cohesive zone of cohesive layers at a bosh level, which is in a considerably high temperature range.

SUMMARY OF THE INVENTION

It is an object of the present invention, in view of the aforesaid problems, to provide a method and apparatus for supervising burdens in a blash furnace, which can stably supervise burdens for a long term regardless of whether they are in a high or low temperature range.

The above object is attained by utilizing the fact that the transmission characteristic of an electromagnetic wave in an ore is different from that in coke, and that this difference is constant from the high to low temperature ranges in a furnace. This allows burdens to be supervised by the transmission, reflection, or scattering of the electromagnetic wave anywhere in the blast furnace.

BRIEF DESCRIPTION OF THE DRAWINGS

The present invention will be clearer from the ensuing description with reference to the accompanying drawings, wherein:

FIGS. 9, 9A and 9B is a block diagram of one example of a supervising system according to the present invention;

FIG. 14 is a perspective view of a waveguide at its open end used for explaining distributions of magnetic and electric fields;

FIG. 15 is a perspective view of a part of a preferred type of waveguide according to the present invention;

FIG. 16 is a perspective view of a part of an another preferred type of waveguide according to the present invention;

FIG. 28A is a cross-sectional view of another type of detection unit according to the present invention, seen from the side of a blast furnace;

FIG. 28B is a cross-sectional view taken along a line B—B in FIG. 28A;

FIG. 28C is a cross-sectional view taken along a line C—C in FIG. 28A;

DESCRIPTION OF THE PREFERRED EMBODIMENTS

Figure 1:
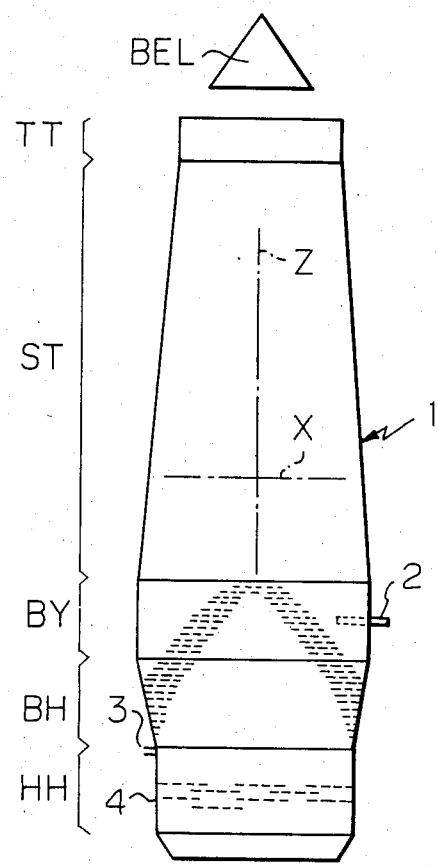
FIG. 1 is a general view of a blast furnace.

FIG. 1 is a general view of a blast furnace 1. One type of detection unit 2 according to the present invention is mounted on the blast furnace 1 at, for example, its belly BY. In FIG. 1, BEL indicates a bell, TT a throat, ST a shaft, BH a bosh, and HH a hearth. Reference numeral 3 represents a tuyere and 4 a tap hole.

Figure 2:
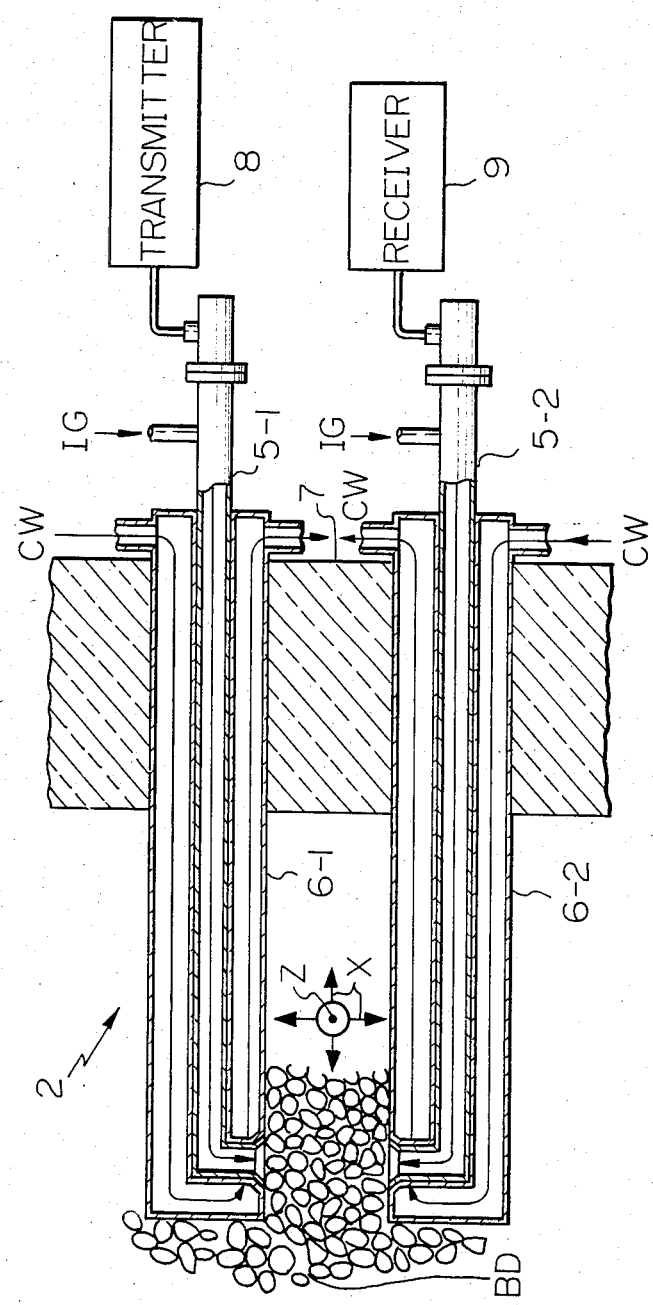
FIG. 2 is a cross-sectional view of one type of a detection unit according to the present invention, seen from the top of a blast furnace.

FIG. 2 is a cross-sectional view of the detection unit 2 in FIG. 1 seen from the top of the blast furnace 1. The detection unit 2 according to the present invention is basically comprised of both a transmitting unit for radiating an electromagnetic wave to the burdens BD in the blast furnace 1 and a receiving unit for receiving the electromagnetic wave reflected or scattered by the mixture BD or transmitted through the mixtures BD. The transmitting unit has a transmitter 8 outside the blast furnace 1. The receiving unit has a receiver 9 outside the blast furnace 1.

In FIG. 2, a first waveguide 5-1 is positioned within a cooling means 6-1 for protection against heat. The cooling means 6-1, together with the waveguide 5-1, penetrates through a furnace wall 7. The waveguide 5-1 is bent at its end when the furnace toward the side of the cooling means 6-1, where it is provided with a horn type antenna. Cooling water CW flows inside the means 6-1. The waveguide 5-1 is provided at its end outside the furnace 1 with the transmitter 8. Further, the waveguide 5-1 has an inlet outside the furnace for blowing inert gas IG, such as nitrogen, through an open end of the waveguide 5-1 terminating in the antenna and inside the furnace 1.

The receiving unit is constructed in the same way as the transmitting unit. That is, a waveguide 5-2 is positioned within a cooling means 6-2. An identical horn type antenna coupled to the open end of the waveguide 5-2 inside the furnace 1 faces the horn type antenna of the waveguide 5-1 on the same horizontal plane. The waveguide 5-2 also has an inlet for forcing through the waveguide 5-2 inert gas IG into the furnace.

The inert gas IG is useful not only for purging the waveguides, but also for cooling the waveguides and preventing ore and coke particles from penetrating therein. To further prevent ore and coke particles from penetrating into the waveguides, the open ends of the antennas may be covered by metal meshes. In this case, the mesh size should be selected so as not attenuate any electromagnetic wave transmission.

Figure 3:
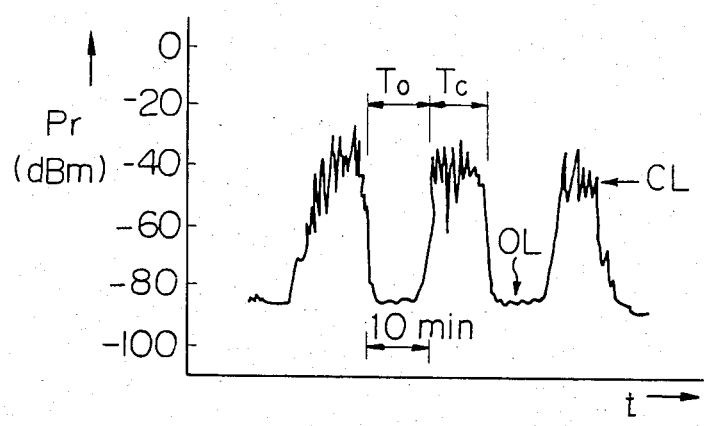
FIG. 3 is a graph of data obtained by the detection unit in FIG. 2.

FIG. 3 is a graph of data obtained by the detection unit of FIG. 2. In the graph, the abscissa indicates a time t and the ordinate a power $P_r$ in dBm. To be specific, $P_r$ denotes the power of the electromagnetic wave received by the receiving unit. The data was obtained with a 20 cm distance between the antennas of the transmitting with receiving units and an X band, i.e., approximately 10 GHz microwave frequency. The transmitted power is +20 dBm. The received power $P_r$ is almost zero, i.e., −86 dBm (refer to the bottom of the curve) when the antennas face the ore layers, because the electromagnetic wave is scattered and absorbed when travelling through the ore layer (OL), and is in a range of −30 to −50 dBm (refer to the top of the curve) when the antennas face the coke layers, because the electromagnetic wave can pass through the coke layer (CL). Thus, the difference of the powers $P_r$ in case of an ore layer and coke layer is 30 to 50 dBm. $T_o$ and $T_c$ will be explained later.

Figure 4:
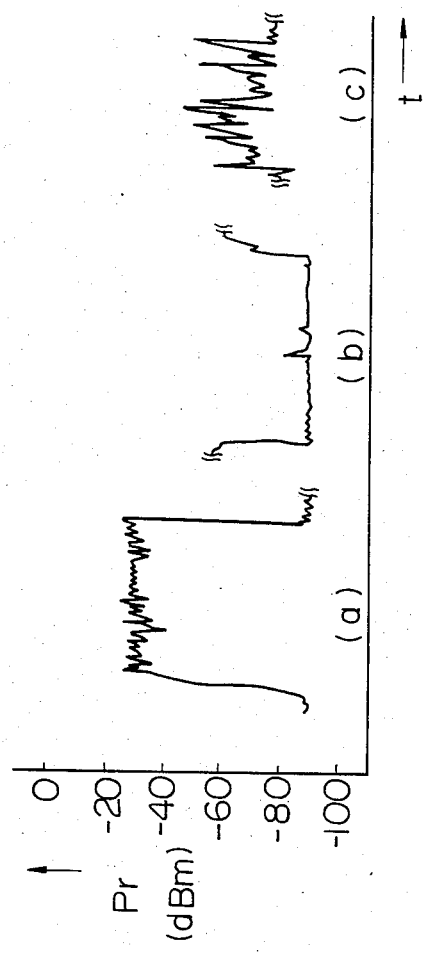
FIG. 4 is a graph of data obtained by the detection unit in FIG. 2 in a case where the burdens do not descend smoothly.

FIG. 4 is a graph of data obtained by the detection unit of FIG. 2 for the case where the burdens do not descend smoothly. Area (a) of the curve shows that the coke layer descends very slowly for a long term in front of the detection unit. Area (b) of the curve shows that the ore layer descends very slowly for a long term in front of the detection unit. Area (c) of the curve shows that a mixed layer of coke and ore descends very slowly for a long term in front of the detection unit. In this example, the temperature at the barrel BL (FIG. 1) is in the range of 1000° C. to 1200° C., where the magnetic characteristics of the ore can no longer be held. However, the detection unit of the present invention can distinguish the ore from the coke. Thus, one of the problems with the prior art methods can be overcome.

The present invention is also useful for supervising charges from the viewpoints of the descending speed and the thickness thereof. For this, another detection unit, identical to the detection unit of FIG. 2, can be introduced into the supervising system. Such two detection units are located apart from each other at a predetermined distance along the longitudinal axis of the furnace. The data from the two detection units are then subjected to a time series analysis. That is, first the data from the upper and lower detection units are stored or recorded, in a time series, in a memory or a recorder, respectively. Next, the time series pattern of a first set of data on the ore layer and a second set of data on the coke layer is analyzed to give the thickness and the descending velocity of each of the ore layer and the coke layer. The two sets of data may be obtained by two adjacent detection units. Alternatively, the transmitting units of an upper detection unit and lower detection unit may be combined, as shown in FIGS. 5A and 5B.

Figure 5A:
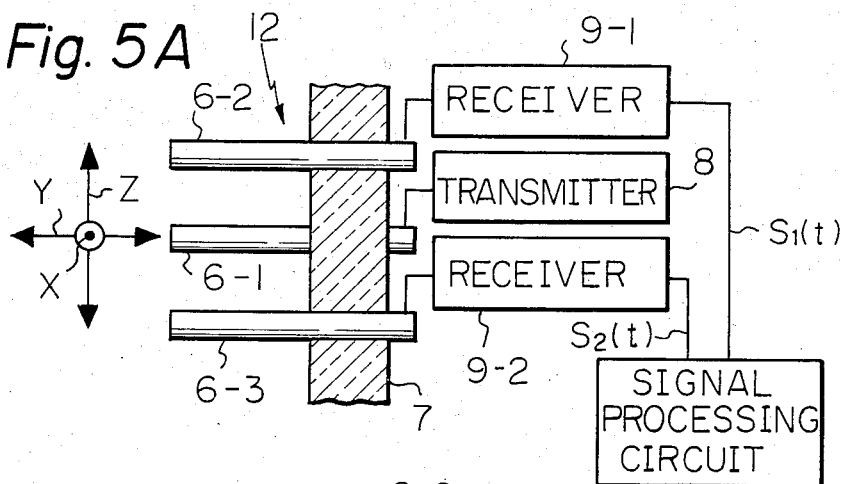
FIG. 5A is a schematic cross-sectional view of two of an another type of detection unit with a common transmitter according to the present invention, seen from the side of a blast furnace.
Figure 5B:
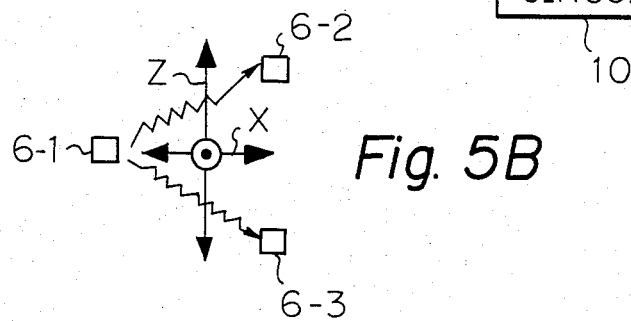
FIG. 5B is a schematic front view of the detection units in FIG. 5A.

FIG. 5A is a schematic cross-sectional view of another type of detection unit according to the present invention, seen from the side of a blast furnace. FIG. 5B is a schematic front view of the detection units in FIG. 5A. Three cooling means, i.e., a second, first, and third cooling means 6-2, 6-1, and 6-3, are mounted to the furnace wall 7 along a longitudinal axis Z from the upper to lower side thereof. The first cooling means 6-1 is horizontally spaced from both the second and third cooling means 6-2 and 6-3 at the same distance therebetween along an X axis perpendicular to the Z axis.

Each of the first to third cooling means 6-1 to 6-3 contains waveguides and antennas identical to those shown in FIG. 2. The waveguides are coupled with a transmitter 8 or receiver 9-1 or 9-2. Detection signals $S_1(t)$ and $S_2(t)$ from the first and second receivers 9-1 and 9-2 are supplied, as input signals, to a signal processing circuit 10 and then processed therein.

Figure 6A:
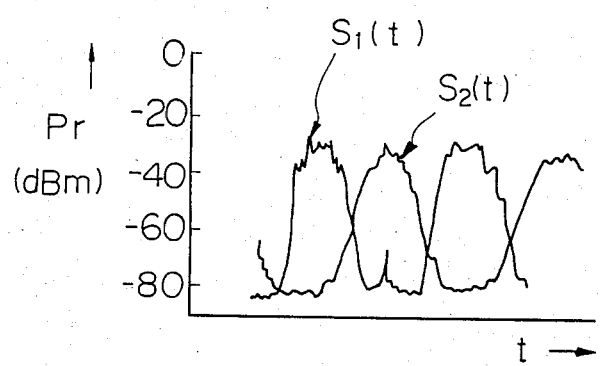
FIG. 6A is a graph of examples of detection signals.

FIG. 6A is a graph of examples of the detection signals $S_1(t)$ and $S_2(t)$. As seen from FIG. 6A, the curves of $S_1(t)$ and $S_2(t)$ are analogous to each other. The abscissa and the ordinate indicate the same elements as in FIG. 3.

The circuit 10 calculates the cross-correlation function of $S_1(t)$ and $S_2(t)$ in order to obtain a delay time T by which the signal $S_2(t)$ from the lower receiver 9-2 is produced after the signal $S_1(t)$ from the upper receiver 9-1. That is, the circuit 10 operates according to the cross-correlation function $\rho(\tau)$, i.e.:

$$\rho(\tau) = \frac{1}{t_0} \int_{t-t_0}^{t} S_1(t) \cdot S_2(t-\tau) dt \qquad (1)$$

where t denotes a present time and $t_0$ denotes a predetermined time constant selected to be much longer than the usual time from when a definite portion of burden passes the antenna of the receiver 9-1 to when it passes the antenna of the receiver 9-2. For example, the time $t_0$ is in a range of 15 to 20 minutes. The expression (1) recited above means that, first, the data of $S_1(t)$ is collected during the time from $(t-t_0)$ to t, second, the data of $S_2(t)$ is collected during the time from $(t-t_0-\tau)$ to $\tau$ ($\tau$ is a shift time), and, third, a product of these data is integrated from $(t-t_0)$ to t.

Next, the shift time $\tau$ is varied until the value of $\rho(t)$ reaches a maximum. The time $\tau$ producing the maximum value of $\rho(\tau)$ corresponds to the aforesaid delay time T. The delay time T corresponds to a descending time with which a burden descends from a level at the upper receiving antenna to a level at the lower receiving antenna. Using the thus obtained delay time T, the circuit 10 then calculates the descending speed V according to an expression $$V = L/T \qquad (2)$$

where L denotes the distance at which the upper receiving antenna and the lower receiving antenna are located from each other.

In this case, the distance L between the upper and lower receiving antennas can be shorter than the thickness of each of the coke layer and the ore layer, which thickness is statistically obtained. According to an experiment (although the thicknesses of the coke layer and the ore layer are in the range of 38 cm through 72 cm and 55 cm through 79 cm, respectively) at the top of the blast furnace, the thicknesses thereof are approximately halved when they descend from the top to the belly thereof.

Figure 6B:
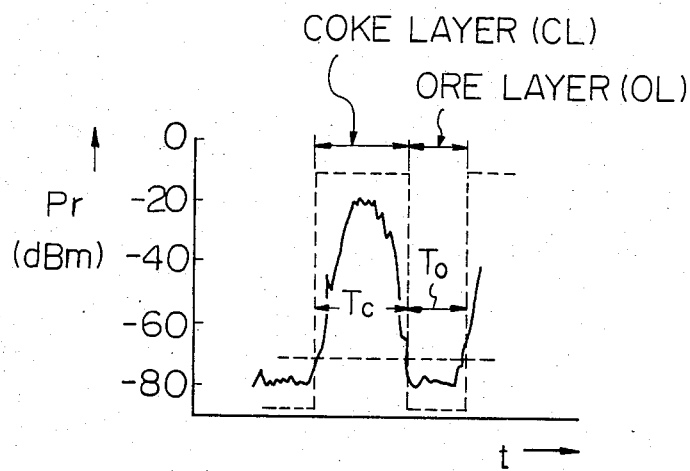
FIG. 6B is a graph of binary digital signals for ore and coke layers.

The circuit 10 can also calculate the thickness $H_o$ of each ore layer and the thickness $H_c$ of each coke layer, using the thus obtained speed V, according to the following expressions (3) and (4), respectively:

$$H_o = V \times T_o \qquad (3)$$

$$H_c = V \times T_c \qquad (4)$$

where, $T_o$ and $T_c$ denote the times shown in FIGS. 3 and 6B. That is, $T_o$ represents the time from when the bottom of an ore layer passes receiving a antenna to when the top passes; $T_c$ similarly represents the time from when the bottom of a coke layer passes a receiving antenna to when the top passes.

The electromagnetic wave is largely attenuated in an ore layer, but substantially passes through a coke layer. Thus, assuming the level of the detection signal S(t), ($S_1(t)$ and $S_2(t)$), is nearly zero for the ore layer, the level for the coke layer becomes considerably high. This means that the ore and the coke can clearly be represented by binary digital signals S(t). FIG. 6B is a graph explaining the binary digital signals S(t) for the ore and coke layers. Signals transformed into binary digital values can be used to measure the layer thickness with a high degree of accuracy.

Figure 7:
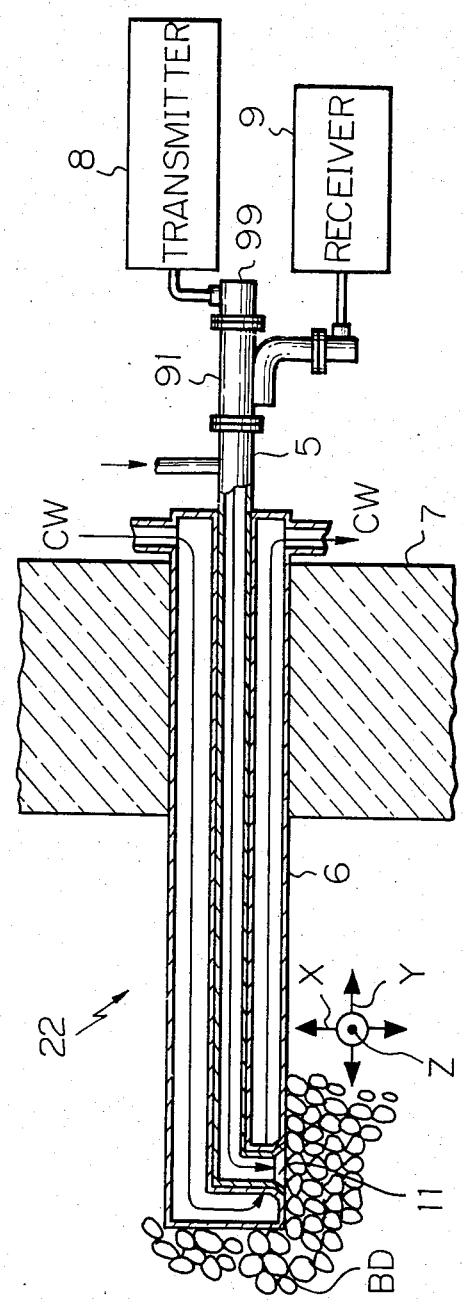
FIG. 7 is a cross-sectional view of an another type of detection unit according to the present invention; seen from the top of a blast furnace.

FIG. 7 is a cross-sectional view of another type of detection unit according to the present invention, seen from the top of a blast furnace. In a detection unit 22, a common waveguide 5 and antenna 11 are used for the transmitting unit and the receiving unit. However, there are an independent transmitter 8 and receiver 9. The waveguide 5 is positioned inside a cooling means 6. The electromagnetic wave supplied from the transmitter 8 to the waveguide 5 via the transition 99 is radiated into the burdens BD via the antenna 11. Then, the radiated electromagnetic wave is reflected by the ore portions and returned again to the waveguide 5. The reflected electromagnetic wave is received only by the receiver 9 by means of a directional coupler 91. That is, the receiver 9 is connected to the waveguide 5 by way of the directional coupler.

Figure 8:
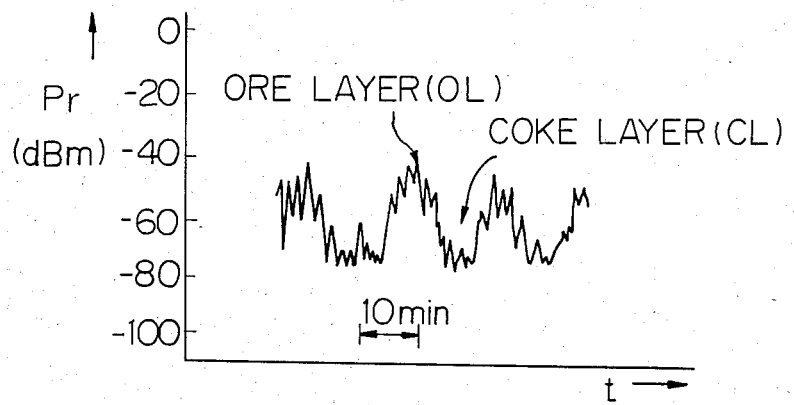
FIG. 8 is a graph of data obtained by the detection unit in FIG. 7.

FIG. 8 is a graph of data obtained by the detection unit 22 in FIG. 7 of which the frequency is set at several 10 GHz. As seen from the graph, the difference in the level of the power $P_r$ for the ore and coke layers is relatively small in comparison with those shown in FIGS. 3, 4, 5, 6A, and 6B. Even so, the unit 22 is very simple and small in structure compared with the units 2 and 12 of FIGS. 2 and 5A and 5B. The units 2 and 12 are transmission types, while the unit 22 is a reflection type. Even though the difference in level is smaller than that obtained by a transmission type unit (2, 12), it is possible to clearly distinguish an ore layer from a coke layer, because the difference in level reaches 20 dBm (−50 to −70 dBm). In addition, the unit 22 and the units 2 and 12 can perform detections even in very high temperature portions, such as a belly BY and bosh BH, in a blast furnace.

Figure 9B:
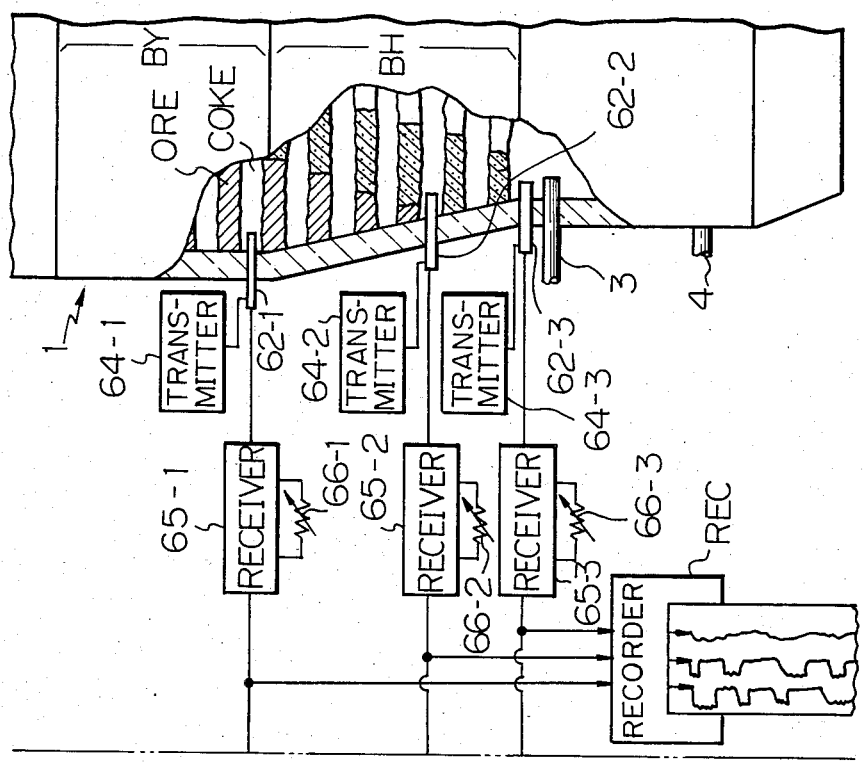

FIGS. 9A and B are a block diagram of one example of a supervising system according to the present invention. In the example, the detection units are similar to that in FIG. 2. A first detection unit 62-1 is located at the border of the belly BY and the bosh BH. A second detection unit 62-2 is located at the middle level of the bosh BH. A third detection unit 62-3 is located at the bottom level of the bosh BH. Each of the units (62-1, 62-2, 62-3) includes a transmitter (64-1, 64-2, 64-3) and receiver (65-1, 65-2, 65-3). The detection signals from these detection units are sent to a recorder REC and to respective waveform processing circuits 67-1, 67-2, and 67-3. The recorder REC records data of the detection signals. The three sets of recorded data in the recorder REC are processed in order to obtain the descending time T, the descending velocity V, and so on of the definite portion of burden which descends from the first unit 62-1 to the second unit 62-2. Similarly, values T and V thereof descending from the second unit 6-2 to the third unit 62-3 can be obtained. Thus the change of the thickness of ore and coke layer descending from the first detection unit 62-1 to the third unit 62-3 can be determined.

The detection signals are transformed in waveform by means of the waveform processing circuits 67-1 through 67-3, so that the waveform of each detection signal inherently having noise ripple is smoothed into a rectangular analog signal. The smoothed signals are converted into digital signals by means of analog/digital (A/D) converter 69 at respective channels 1, 2, and 3. The A/D converter 69 is connected to a microprocessor (CPU) 70.

The microprocessor 70 instructs the A/D converter 69 periodically to produce A/D converted signals and then stores them in random access memories (RAM) 71 corresponding to the three channels, i.e., stores them in RAM1, RAM2, and RAM3, wherein the suffixes "1", "2", and "3" denote the relation with the detection units 62-1 to 62-3. When a predetermined amount of data is stored in the RAM 71, the microprocessor 70 starts processing the data according to the cross-correlation function $p(t)$ and then producing the delay time $T_{12}$ and $T_{23}$, the descending velocity $V_{12}$ and $V_{23}$, the layer thickness $H_o$ and $H_c$, and so on by using the distances $L_{12}$ and times $T_o$, $T_c$. Since the procedures for producing these values (T, V, H - - - ) having already been explained in detail, no further explanation is given here. Numerals 66-1, 66-2, 66-3, 68-1, 68-2, and 68-3 represent variable resistors for the adjustment of the sensitivity of the detection units.

A cathode ray tube (CRT) display 73 displays the calculated values (V, T, H). The distribution of the ore and coke layers in the furnace are also graphically illustrated on the display 73. The calculated values are printed out by a printer 74. External instructions by an operator are given via a keyboard 75. The keyboard 75, display 73, and printer 74 are connected to the microprocessor 70 by way of an input/output (I/O) interface 72.

Figure 10:
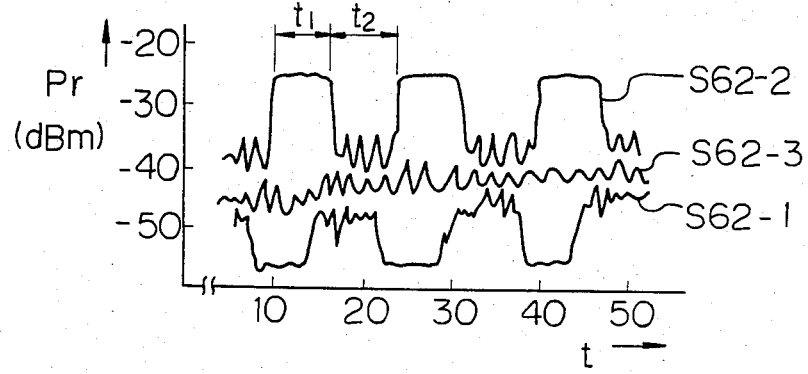
FIG. 10 is a graph of data obtained in the supervising system in FIG. 9.

FIG. 10 is a graph of data obtained in the supervising system in FIG. 9. The graph of FIG. 10 is analogous to that of FIG. 8. Numerals on the abscissa indicate time in minutes. The characters S62-1, S62-2, and S62-3 represent detection signals obtained from the first, second, and third detection units 62-1, 62-2, and 62-3, respectively. The deflected wave is weak with respect to an ore layer, stronger to a coke layer, and strongest to a cohesive layer. The signal S62-1 exhibits periodic stronger and weaker reflected electromagnetic waves. A stronger electromagnetic wave means that a coke layer is in front of the antenna of the unit 62-1. A weak electromagnetic wave means that an ore layer is in front of the antenna of the unit 62-1. The signal S62-2 exhibits a periodic, stronger and strongest reflected electromagnetic wave. The strongest electromagnetic wave means that a cohesive layer is in front of the antenna of the unit 62-2. The stronger electromagnetic wave means that a coke layer is in front of the antenna of the unit 62-2. The signal S62-3 exhibits a constant level signal with high frequency ripple. This means that a cohesive layer is melted away and only a coke layer is in front of the antenna.

The signals S62-1 and S62-2 are almost symmetric with each other. From these signals, it becomes clear that the cohesive zone is located between the levels of the units 62-1 and 62-3. Accordingly, if the cross-correlation function is calculated with the signal S62-2 and the inverted signal S62-1, a trapezoid waveform signal having a maximum level is obtained.

Figure 11:
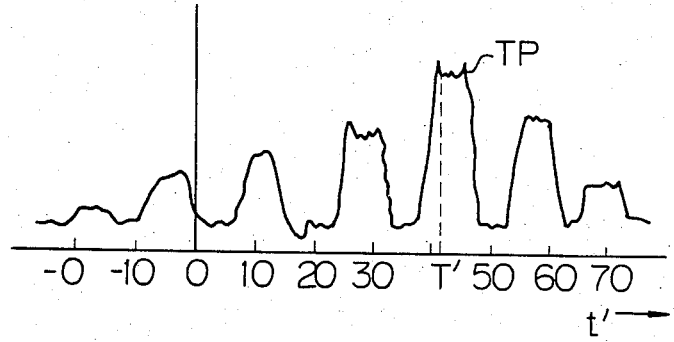
FIG. 11 is a graph of data of the cross-correlation function with a variable of delay time.

FIG. 11 is a graph of the cross-correlation function. In the graph, the abscissa indicates a correlated time t' in minutes and the ordinate indicates the resultant cross-correlation function $p(t')$. To be specific, the value of the detection signal S62-1 is, first inverted, delayed by the delay time t' and then multiplied with the value of the detection signal S62-2. As a result, the aforesaid trapezoid waveform signal TP of maximum level appears with the delay time of T'. Since an expression $V_{12} = L_{12}/T_{12}$ stands, as in the above-recited expression (2), the thickness $H_{co}$ of the layer of ore can be obtained from the expression $H_{co} = V_{12} \cdot t_1$, as in the above-recited expressions (3) and (4), where $t_1$ denotes a pulse width of the signal S62-1 (refer to $t_1$ in FIG. 10). Similarly, the thickness of the coke layer $H_c$ is obtained from the expression $H_c = V_{12} \cdot t_2$, where $t_2$ is a part of the signal S62-1 as shown in FIG. 10. Thus, as a result, the thickness of the cohesive layer can be known.

Figure 12A:
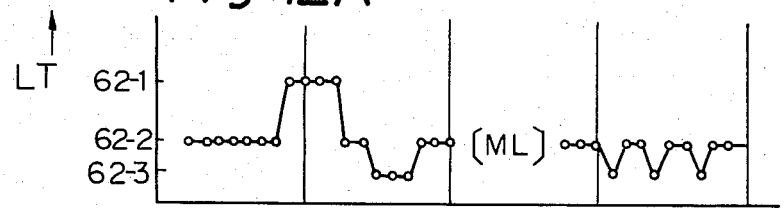
FIGS. 12A, 12B, and 12C are graphs of data of long-term measurements.
Figure 12B:
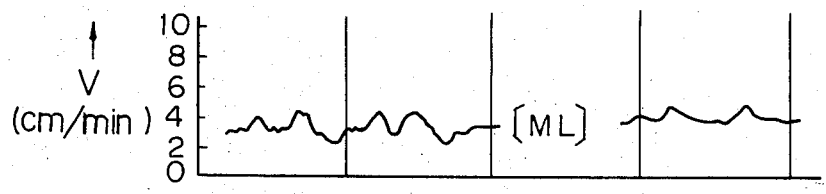
Figure 12C:
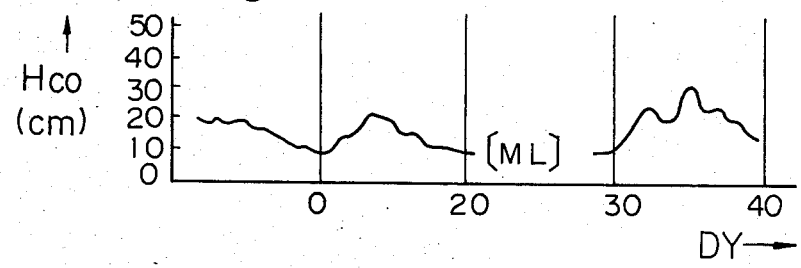

FIGS. 12A, 12B, and 12C show graphs of data of long-term measurements. Each abscissa of the graphs indicates elapsed days DY. The ordinates of the graphs of FIGS. 12A to 12C indicate, respectively, a location LT of the cohesive layer, a descending velocity V in cm/min, and a thickness of the cohesive layer $H_{CO}$ in cm. It will be apparent from these graphs that, first, the descending V is maintained at a constant level and, second, the larger the thickness $H_{co}$, the lower the location LT and vice versa. Each ML (mixture layer) in FIGS. 12A, 12B, and 12C represents a term in which each of the units 62-1, 62-2, and 62-3 produces a signal exhibiting a constant reflected electromagnetic wave, but having a ripple thereon. This means a mixed layer is formed between the furnace wall and the root, which mixed layer is mainly composed of coke.

Some of the detection units may not produce their detection signals if a thick deposit is formed in front of the detection unit. However the bottom detection unit 62-3 can still produce a detection signal as usual until the cohesive layer descends close thereto.

Figure 13A:
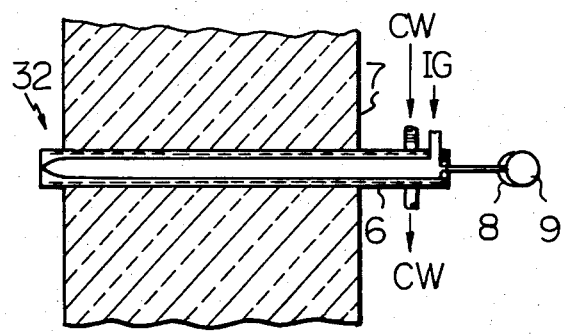
FIG. 13A is a cross-sectional view of another type of detection unit according to the present invention, seen from the side of a blast furnace.
Figure 13B:
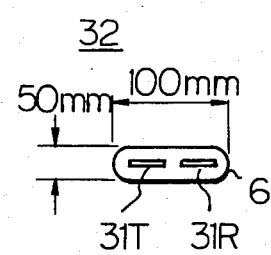
FIG. 13B is a front view of the detection unit in FIG. 13A.

FIG. 13A is a cross-sectional view of another type of detection unit according to the present invention, seen from the side of a blast furnace. FIG. 13B is a front view of the detection unit in FIG. 13A. The detection unit 32 is comprised of parallel transmitting and receiving units in a one-piece construction. The waveguides of these parts are positioned in a single cooling means 6. The end of each waveguide is formed as a slit and serves as an antenna. Slits 31T and 31R are the transmitting antenna and a receiving antenna, respectively, and are 3 mm in width and 20 mm in length. The antennas are aligned on the same plane.

Regarding the slits 31T and 31R, generally, horn type or parabolic type antennas are used for transmitting and receiving the electromagnetic wave. The former types of antennas, however, allow easy entry of dust and impurities into the waveguides through their wide open ends. Such open ends can be plugged by a refractory through which the electromagnetic wave can be transmitted. However, in this case, undesired deposits gradually grow on the refractory and finally impede the transmission of the electromagnetic wave therethrough. The latter types of antennas are difficult to cool on blast furnace walls because of their complex structure. In detection unit 2 of FIG. 2, this problem was solved by using a metal mesh together with purging by an inert gas. In the detection unit 32, antennas formed by a slender slit are employed along with purging by inert gas.

If the waveguide itself is slender only at its open end its efficiency would tend to deteriorate due to two reasons. First, undesired current flows through the tapered portion, made of metal, at the open end, and produces a loss in electromagnetic wave power. Second, the cut-off frequency is shifted to the high frequency side and, therefore, the electromagnetic wave cannot pass through the tapered portion freely.

FIG. 14 is a perspective view of a waveguide at its open end used for explaining distributions of magnetic field and electric field. The waveguide 5 has a rectangular shape, a long side and a short side of which are b and c in length, respectively, in which a distribution of the magnetic and electric fields is a $TE_{10}$ mode wave. The electric field EF is in the direction of the short side, while, the magnetic field MF is in the direction of the long side. The electric field EF reaches its maximum strength at the center of the long side and its minimum strength of zero at both side walls (refer to curve EFS). The curve EFS indicates the distribution of the electric field strength. Accordingly, if a slender slit or grating is formed in the direction of the electric field EF, the power loss increases greatly. If formed in a direction perpendicular to the electric field, however, the power loss can be minimized.

The cut-off wavelength $\lambda_c$ of the rectangular waveguide in the mode of the $TE_{10}$ wave is determined by the length b of the long side only, regardless of the length c of the short side, according to the following expression (5):

$$\lambda_c = 2b \quad (5)$$

Thus, attenuation of the transmission and reception effiency of the electromagnetic wave can be kept minimal when the grating is formed parallel to the long side (b) or a slender slit having a length of b is formed at the center of the waveguide 5, such as shown in FIGS. 15 and 16.

FIG. 15 is a perspective view of a part of a preferred type of waveguide according to the present invention. FIG. 16 is a perspective view of a part of an another preferred type of waveguide according to the present invention. In FIG. 15, the waveguide 5 has a tapered portion near its open end A, forming a slender slit. The tapered portion including the open end A functions as an antenna, as previously illustrated in FIG. 13B. In FIG. 16, the waveguide 5' is formed at its open end A' as a grid. In other words, a plurality of parallel slender slits are formed at the open end. As previously mentioned, each of the waveguides 5 and 5' has an inlet for supplying inlet gas at the other end thereof. Each of the waveguides 5 and 5' has a size of, for example, b=22.9 mm, c=10.2 mm. The open end A of the waveguide 5 has the width a of, for example, 5.0 mm, extent of which is one half the open end of the waveguide itself. Each slit of the waveguide 5' has a width a' of 2 mm and is separated by a grating plate having a width e of 0.5 mm.

Figure 17A:
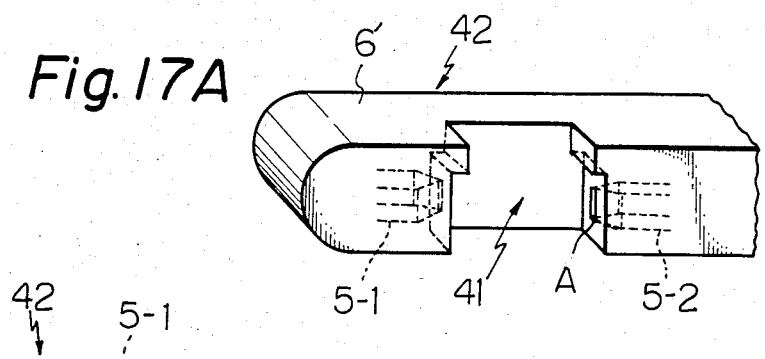
FIG. 17A is a perspective view of a part of an another type of detection unit according to the present invention.
Figure 17B:
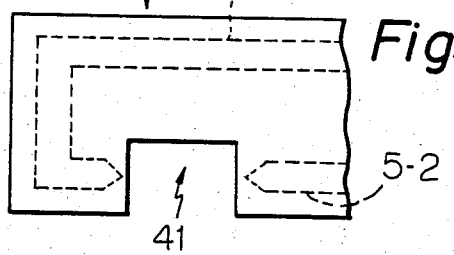
FIG. 17B is a top plan view of the detection unit in FIG. 17A.

FIG. 17A is a perspective view of a part of an another type of detection unit according to the present invention. FIG. 17B is a top plan view of the detection unit shown in FIG. 17A. In a detection unit 42, a first waveguide 5-1 is of an overall L-shape. The slit-like open end A of the waveguide 5-1 faces that of a second waveguide 5-2. A cooling means 6' forms a shelter containing the waveguides therein, but has a partial recess 41. Thus, the burdens BD can only descend through the recess 41.

Figure 18A:
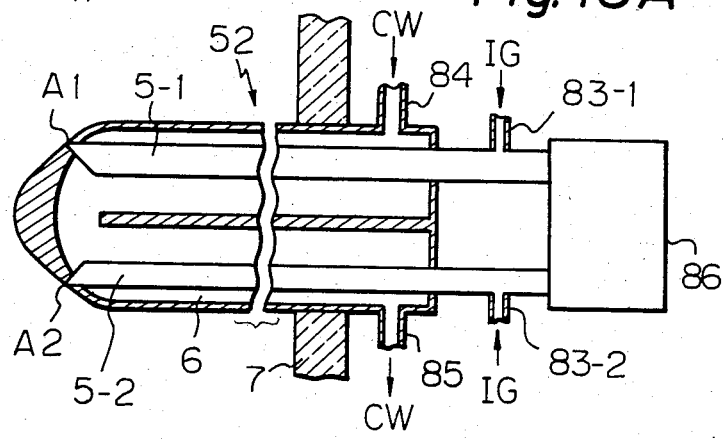
FIG. 18A is a cross-sectional view of an another type of detection unit according to the present invention, seen from the side of a blast furnace.
Figure 18B:
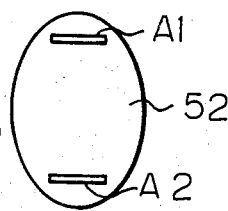
FIG. 18B is a front view of the detection unit in FIG. 18A.

FIG. 18A is a cross-sectional view of another type of detection unit according to the present invention, seen from the side of a blast furnace. FIG. 18B is a front view of the detection unit in FIG. 18A. Reference numeral 52 represents the detection unit. Two slit-like open ends A1 and A2 are formed at upper and lower stages at the end of the unit 52. The slender slit-like open ends A1 and A2 each extend perpendicular to the direction in which the burdens BD descend in the furnace, as shown in FIG. 18B. In this example, the open ends (A1, A2) have a size of 5 mm×22.9 mm, and are positioned at a distance of 100 mm from each other. Reference numerals 83-1 and 83-2 are inlets for supplying the inert gas IG into waveguides 5-1 and 5-2, respectively. Reference numeral 84 is an inlet for supplying cooling water CW into the cooling means 6, and 85 is an outlet for draining the water CW. Reference numeral 86 represents an electromagnetic wave transmitting and receiving circuit located outside the furnace and coupled to the outer ends of the waveguides 5-1 and 5-2.

Figure 19:
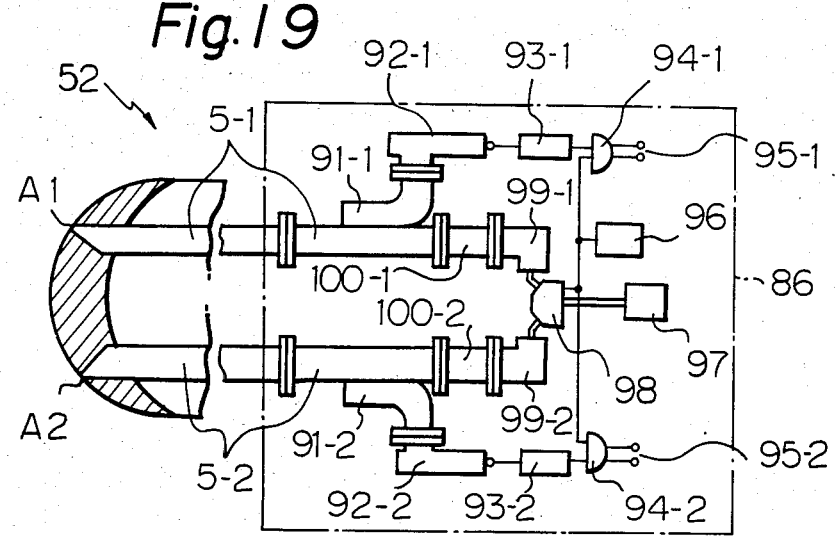
FIG. 19 is a view of one example of a transmitting and receiving circuit in FIG. 18A.

FIG. 19 illustrates an example of the transmitting and receiving circuit 86 in FIG. 18A. The circuit 86 is comprised of directional couplers 91-1 and 91-2, heterodyne detectors 92-1 and 92-2, intermediate frequency (IF) amplifiers 93-1 and 93-2, switches 94-1 and 94-2, output terminals 95-1 and 95-2, switching signal generator 96, an oscillator 97, coaxial switch 98, transitions 99-1 and 99-2, and isolators 100-1 and 100-2. The operation of the circuit 86 will be explained later.

Figure 20:
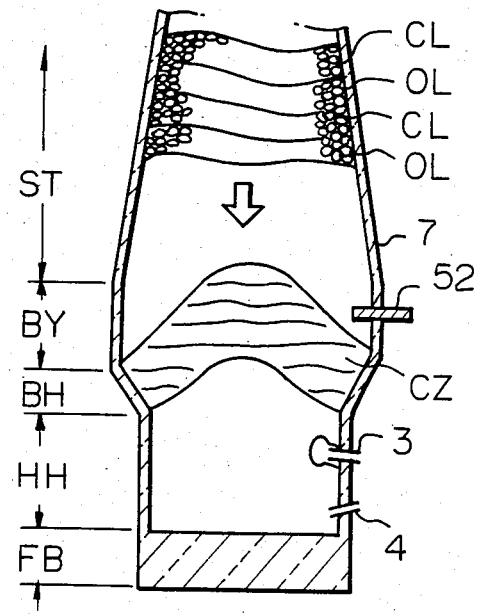
FIG. 20 is another view of a blast furnace.

FIG. 20 is another general view of a blast furnace. The major part of the furnace has already been explained with reference to FIG. 1. Characters CL, OL, CZ, and FB represent the coke layer, the ore layer, the cohesive zone of the cohesive layers, and the furnace bottom, respectively.

The detection unit 52 shown in FIGS. 18A, 18B, and 19 is mounted to the furnace wall 7 at the belly BY. For example, the detection unit 52 can be projected 50 cm in length from the furnace wall. The unit 52 produces an electromagnetic wave, such as an X-band microwave, from the oscillator 97. The electromagnetic wave reaches the slit-like open ends A1 and A2 by way of the coaxial switch 98 and the transistors 99-1 and 99-2, selectively. When the coaxial switch 98 is operated to guide the output of the oscillator 97 to the transition 99-1, the oscillation output from the oscillator 97 is radiated, via the above-mentioned route, from the open end A1 into the burdens BD. The radiated electromagnetic wave is reflected by the burdens and then returns to the waveguide 5-1 via the open end A1. Further, the reflected electromagnetic wave reaches the output terminal 95-1 by way of the directional coupler 91-1, the heterodyne detector 92-1, the IF amplifier 93-1, and the switch 94-1. On the other hand, the radiated electromagnetic wave passes through the burdens and reaches the open end A2. The thus transmitted electromagnetic wave is led from the open end A2 to the output terminal 95-2 by way of the waveguide 5-2, the directional coupler 91-2, the heterodyne detector 92-2, the IF amplifier 93-2, and the switch 94-2.

When the coaxial switch 98 is operated to guide the output of the oscillator 97 to the transistor 99-2, the oscillation output from the oscillator 97 is radiated from the open end A2 into the burdens BD. The thus radiated electromagnetic wave is, reflected by the charges and returns to the open end A2, which reflected electromagnetic wave is detected via the output terminal 95-2, and, on the other the radiated wave from the open end A2 is transmitted through the burdens and detected, via the open end A1, at the output terminal 95-1.

Figure 21A:
FIGS. 21A, 21B, and 21C depict signals charts used for explaining the operation of the circuit in FIG. 19.
Figure 21B:
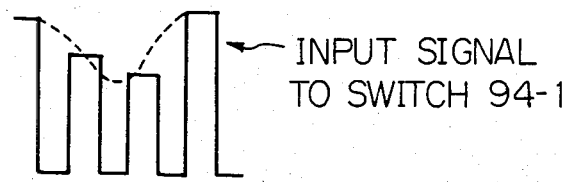
Figure 21C:
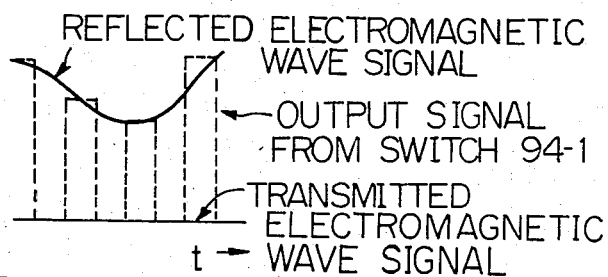

FIGS. 21A, 21B, and 21C depict signal charts used for explaining the operation of the circuit 86 in FIG. 19. The switching signal generator 96 produces a switching signal shown in FIG. 21A. The switching signal has a frequency sufficiently higher than the variation of the detection signals $S_1(t)$ and $S_2(t)$. Thus, the switching signal switches the coaxial switch 98 with a very high frequency. Therefore, the open ends A1 and A2 alternately radiate or receive the electromagnetic wave. As a result, the output terminal 95-1 outputs the reflected electromagnetic wave and the transmitted radio wave alternately in synchronism with the switching signal. Simultaneously, the output terminal 95-2 inversely outputs the transmitted electromagnetic wave and the reflected electromagnetic wave in synchronism therewith. Each of the switches 94-1 and 94-2 has two independent outputs for separating the reflected and transmitted electromagnetic waves from each other.

The reflected electromagnetic wave detected through the open end A2 appears after that detected through the open end A1 for the same burden, because the open end A1 is at a higher level than the open end A2 by, for example, 100 mm. However, such a difference in the detected electromagnetic waves is not large in the transmitted signals detected at the output terminals 95-1 and 95-2. This is because the reflected electromagnetic waves are obtained by the burdens in front of the open ends A1 and A2; however, each transmitted electromagnetic wave is obtained by the same burdens between the open ends A1 and A2. Thus, the previously explained delay time T between the detection signals obtained via the open ends A1 and A2 can be found first. Then, by using the delay time T, the descending velocity V can be found based on the above-recited expression (2).

Returning to FIG. 20, the coke and the ore are set in the form of layers. Each layer has a width of 20 to 50 cm. The average particle size of the coke is about 50 mm. The average particle size of the ore, when sintered in the furnace, is in a range of 10 to 15 mm.

As previously mentioned the wavelength of the electromagnetic wave to be radiated into the furnace is selected to be 3 cm, i.e., the X band. Use of such a microwave is advantageous for achieving measurement with a high sensitivity for the coke and the ore, because such a wavelength is almost the same as the average particle size of the coke particles and the ore particles. However, it should be noted that, in the present invention, the electromagnetic wave is not limited to a microwave. A millimeter wave or a meter wave is also applicable.

Figure 22:
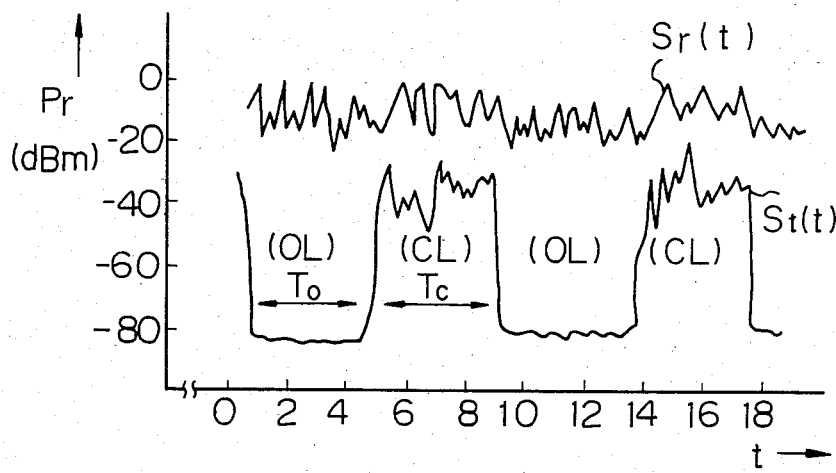
FIG. 22 is a graph of data obtained using the detection unit shown in FIGS. 18A, 18B, 19, and 20.

FIG. 22 is a graph of data obtained using the detection unit 52 shown in FIGS. 18A, 18B, 19, and 20. The detection signal $S_t(t)$ represents the power of the electromagnetic wave transmitted through the burdens, while the signal $S_r(t)$ represents the power of the electromagnetic wave reflected by the burdens. When the observed burdens are composed of coke, the signal $S_t(t)$ is on the order of −40 dBm, while when the observed burdens are composed of ore, the signal $S_t(t)$ is on the order of −85 dBm. Thus, the coke layer and the ore layer are clearly distinguished from each other by a difference of the signal power.

On the other hand, the power of the signal $S_r(t)$ exhibits a high frequency and continuous fluctuation in a range of −10 to −20 dBm. The frequency of the fluctuation is created by successive higher peaks of the fluctuation which are produced every time ore or coke particles face the open end. Each lower peak of the fluctuation is produced every time the open end faces a gap formed between adjacent ore and/or coke particles.

Figure 23:
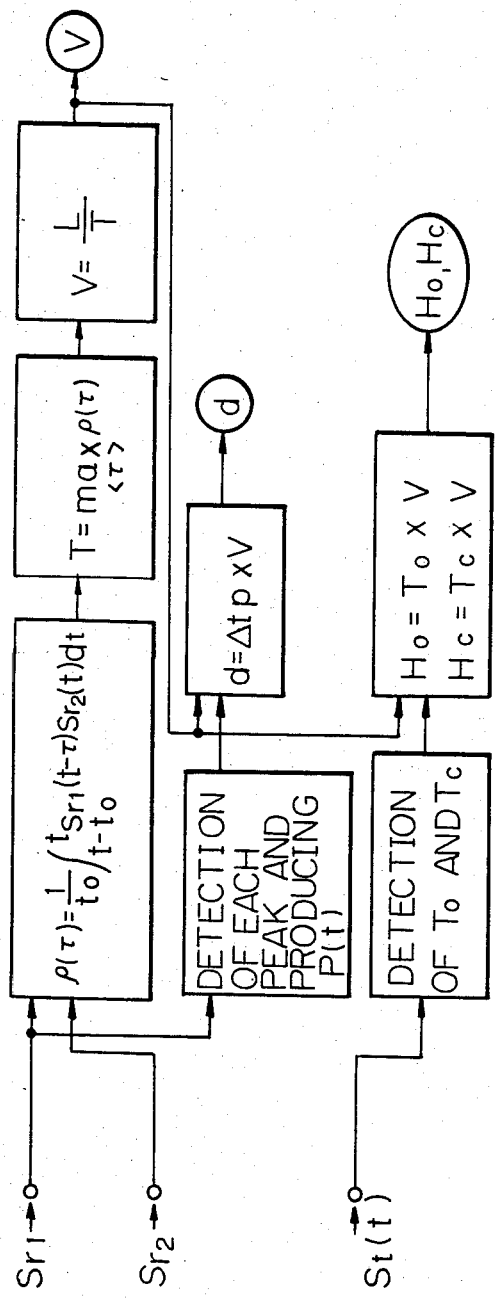
FIG. 23 is a schematic flow diagram for calculating a descending velocity, particle size, and thicknesses by using signals produced from the circuit in FIG. 19.

FIG. 23 is a schematic flow diagram for calculating the descending velocity V, the particle size d, and the thicknesses $H_o$ and $H_c$, by using the signals $S_t(t)$ and $S_r(t)$ produced from the circuit shown in FIG. 19. In FIG. 23, the symbols $S_{r1}(t)$ and $S_{r2}(t)$ represent the detection signals of the reflected electromagnetic waves produced from the output terminals 95-1 and 95-2, respectively. The signal $S_{r2}(t)$ has a waveform analogous to the signal $S_{r1}(t)$, but appears after the signal $S_{r1}(t)$, because the related open ends A1 and A2 are positioned at different levels along the longitudinal axis of the furnace. The signals $S_{r1}(t)$ and $S_{r2}(t)$ are processed according to the above-recited expression (1) so as to calculate the cross-correlation function $\sigma(\tau)$, which is here expressed as $$\rho(\tau) = \frac{1}{t_0} \int_{t-t_0}^{t} S_{r1}(t-\tau) \cdot S_{r2}(t) dt \qquad (1')$$

Figure 24A:
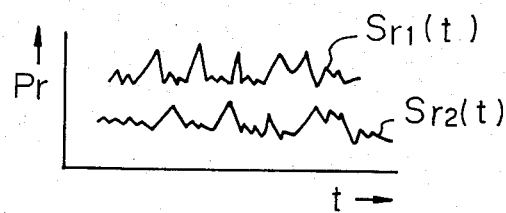
FIGS. 24A and 24B are graphs of data used for explaining the flow diagram of FIG. 23.
Figure 24B:
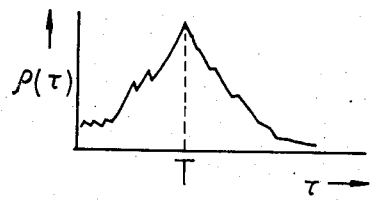

FIGS. 24A and 24B depict graphs of data used for explaining the flow diagram of FIG. 23. When the function $\sigma(\tau)$ of the expression (1') is calculated, the value of $\sigma(\tau)$ becomes maximum at the time T, as shown in FIG. 24B. Thus, the descending velocity V is calculated using the thus obtained time T and the distance L between A1 and A2, based on the above-recited expression (2).

Each higher peak of each of the signals $S_{r1}(t)$ and $S_{r2}(t)$ indicates the existence of a particle facing the open end A1 and A2, respectively. These higher peaks are successively transformed into a pulse train signal P(t). Using the pulse period $\Delta t_p$ and the descending velocity V, the particle size d can be obtained from an expression (6):

$$d = \Delta t_p \times V \qquad (6)$$

The signal $S_t(t)$ of the electromagnetic wave transmitted from each of the output terminals 95-1 and 95-2 has different levels in correspondence with the ore layer OL and coke layer CL during each term $T_o$ and $T_c$ as shown in FIG. 22. Using these terms $T_c$ and $T_o$, the thickness $H_c$ of the layer CL and the thickness $H_o$ of the layer OL can be calculated, based on the above-recited expressions (3) and (4), respectively.

Figure 25A:
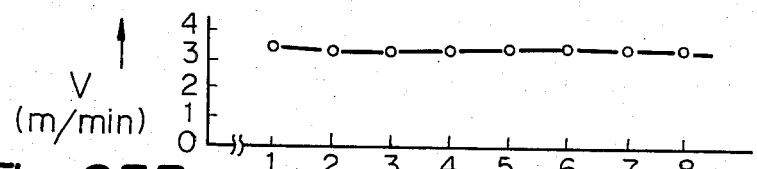
FIGS. 25A, 25B, and 25C are graphs of data obtained using the detection unit shown in FIG. 19.
Figure 25B:
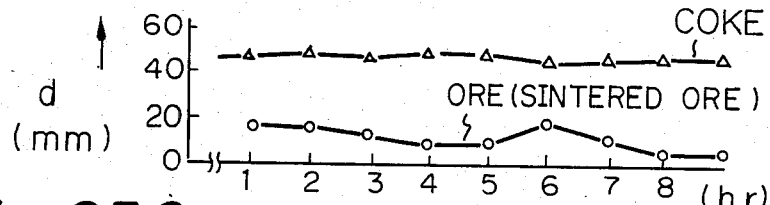
Figure 25C:
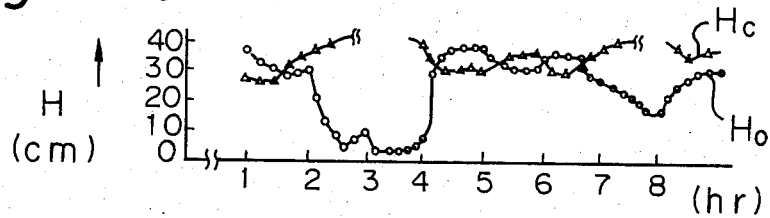

FIGS. 25A, 25B, and 25C depict graphs of data obtained using the detection unit 52 in FIG. 19. FIGS. 25A, 25B, and 25C show, respectively the descending velocity V, the particle size d, and the thickness H of the layers, of which values change along with the time elapsed in hours. When obtaining the data of FIGS. 25A, 25B, and 25C, measurements of the signals from the output terminals 95-1 and 95-2 were conducted continuously, but the calculations for producing the data were conducted every 10 minutes.

Figure 26:
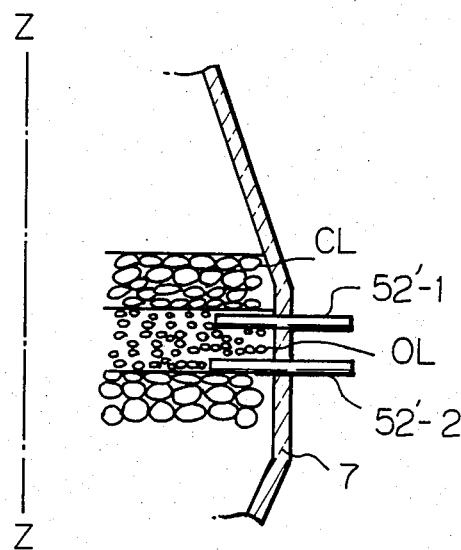
FIG. 26 is a partial cross-sectional view of a blast furnace in which two sets of detection units having a construction expressed in FIG. 27 are mounted.
Figure 27:
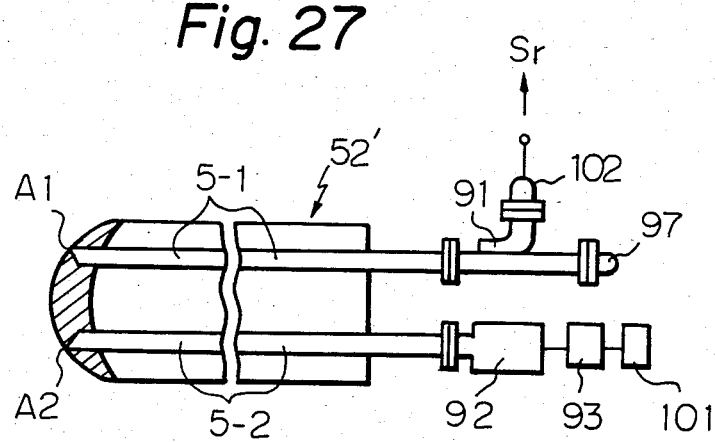
FIG. 27 is a partial cross-sectional view of the detection units in FIG. 26.

FIG. 26 is a partial cross-sectional view of a blast furnace in which two detection units, each having a construction drawn in FIG. 27, are mounted. Detection units 52'-1 and 52'-2 are both mounted at the belly of the furnace. Each of the detection units 52'-1 and 52'-2 detects both signals of reflected and transmitted electromagnetic waves. These detection signals are analogous to that of FIG. 22. In the example, the units 52'-1 and 52'-2 are arranged vertically along the Z-axis at a distance of 30 cm.

FIG. 27 is a partial cross-sectional view of the detection units 52'-1 and 52'-2 in FIG. 26. Major parts are similar to those of FIG. 19. That is, the open ends A1 and A2, the waveguides 5-1 and 5-2, the heterodyne detector 92, the IF amplifier 93, and the oscillator 97 are identical to those of FIG. 19. Reference numerals 101 and 102 represent a detector and a crystal detector, respectively. The detector 102 produces the detection signal $S_r$ of the reflected electromagnetic wave. The electromagnetic wave is radiated, by means of the oscillator 97, from the open end A1. This reflected electromagnetic wave returns to the waveguide 5-1 and reaches the detector 102 by way of the directional coupler 91. On the other hand, the electromagnetic wave transmitted from the open end A1 to the open end A2 through the burdens is detected as the signal $S_t$ via the waveguide 5-2, the heterodyne detector 92, and the IF amplifier 93 by the detector 101. The descending velocity V, the thicknesses $H_c$ and $H_o$, and the particle size d are calculated as in the flow chart of FIG. 23, except that the delay time T is obtained based on the signals of the two transmitted electromagnetic waves.

FIG. 28A is a cross-sectional view of another type of detection unit according to the present invention, seen from the side of a blast furnace; FIG. 28B is a cross-sectional view taken along the line B—B in FIG. 28A. FIG. 28C is a cross-sectional view taken along the line C—C in FIG. 28A. Members the same as those of FIGS. 2, 7, and 18A are represented by the same reference numerals or characters. A feature of the detection unit 120 is that the open ends A2 and A3 are positioned on the same side, while the open end A1 is positioned on the opposite side. Reference numeral 121 in FIG. 28C represents pressure-proof quartz. In making measurements using the detection unit 120, a electromagnetic wave having, for example, 10 GHz frequency and +20 dBm (100 mW) power is generated from a electromagnetic wave transmitting and receiving circuit 9'. The thus generated electromagnetic wave is radiated, via the waveguide 5-1, from the open end A1 into the burdens. The radiated electromagnetic wave is scattered by the ore layer OL and reaches the open ends A2 and A3. Then, the electromagnetic waves are introduced, via the ends A2 and A3, into respective waveguides 5-2 and 5-3 and led outside the furnace. The led electromagnetic waves are detected by the electromagnetic wave receivers 8-2 and 8-3. The electromagnetic wave led to the circuit 9' is stronger in power when the open end A1 faces each ore or coke particle than the electromagnetic wave led thereto when a space surrounds the end A1. Such a difference in power is used for calculating the particle size.

Figure 29A:
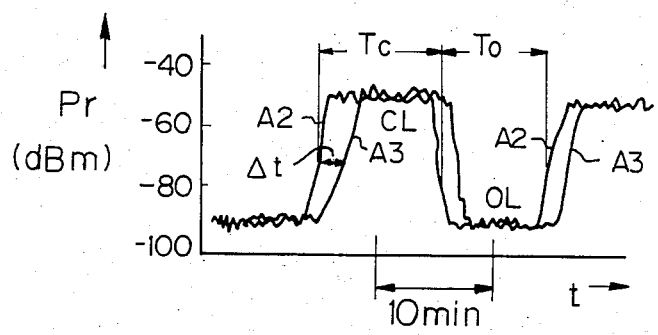
FIGS. 29A and 29B depict graphs of data obtained by the detection unit shown in FIGS. 28A through 28C.
Figure 29B:
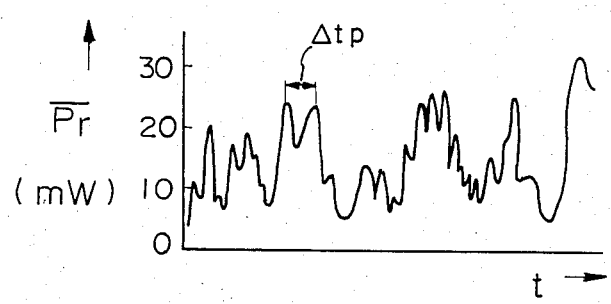

FIGS. 29A and 29B depict graphs of data obtainb by the detection unit 120 in FIGS. 28A through 28C. FIG. 29A indicates power of the scattered electromagnetic waves reaching the open ends A2 and A3. The signal at the point CL represents the electromagnetic wave scattered by the coke layer, while the signal at the point OL represents that scattered by the ore layer. FIG. 29B indicates the power in mW of the scattered electromagnetic wave reaching the open end A1. The signal of FIG. 29B is not an unprocessed signal, but a signal processed via a low pass filter so as to remove noise therefrom. As seen from FIG. 29A, the scattered electromagnetic wave measured through the open end A3 occurs Δt after the electromagnetic wave measured through the open end A2. The reason for this is that the open ends A2 and A3 are arranged vertically at a distance L therebetween, where the end A2 is higher than the end A3.

The descending velocity V is calculated with the thus obtained delay time Δt by an expression (2'), which is a modified form of expression (2):

$$V = L/\Delta t \times C_c \qquad (2')$$

where $C_c$ denotes a compensation coefficient, which is determined in advance through experiments. The unit 120 has a $C_c$ of, for example, 0.5.

Once the descending velocity V is determined, the thickness $H_c$ and the thickness $H_o$ are calculated according to the above recited expressions (3) and (4). For example, based on the data shown in FIG. 29A, $H_c = 0.44$ m and $H_o = 0.36$ m.

The particle size d can be calculated with the peak period Δtp shown in FIG. 29B based on the above recited expression (6).

Further, the thickness $H_{CL}$ of the cohesive layer can also be measured by detecting objects located in front of the open ends A2 and A1. That is, when the coke layer CL exists in front of the open end A2, the power $P_r$ of the scattered electromagnetic wave is high, as shown in FIG. 29A. However, when the cohesive zone CZ is located in front of the open end A2, the power $P_r$ becomes too low to obtain a detection signal. From such a difference in the power $P_r$, the existence of the layer of the cohesive ore can be known. Further, the thickness $H_{CL}$ can be determined by the fact that the cohesive layer passes the open end A1.

Incidentally, only one transmitter side open end A1 is shown in FIG. 28B, as an example, but a plurality of identical open ends may be mounted to the detection unit, if necessary.

The dimensions of the major parts of the detection unit 120 are written in FIGS. 28A and 28B.

Figure 30A:
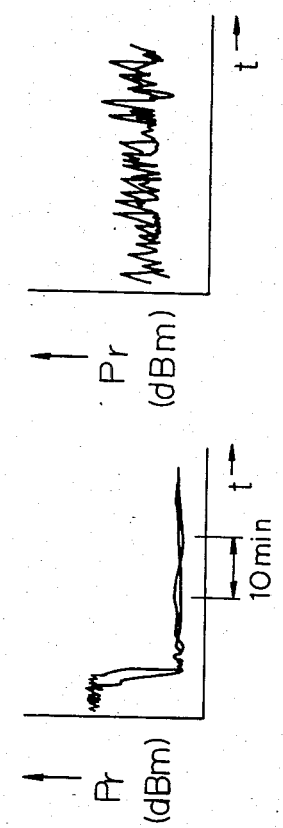
FIG. 30A depicts graphs of electromagnetic powers in dBm and mW detected when a coke layer stops descending for a long term in a furnace.
Figure 30B:
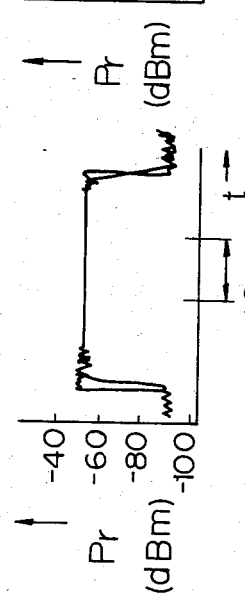
FIG. 30B depicts graphs of electromagnetic powers in dBm and mW detected when an ore layer stops descending for a long term in a furnace.
Figure 30C:
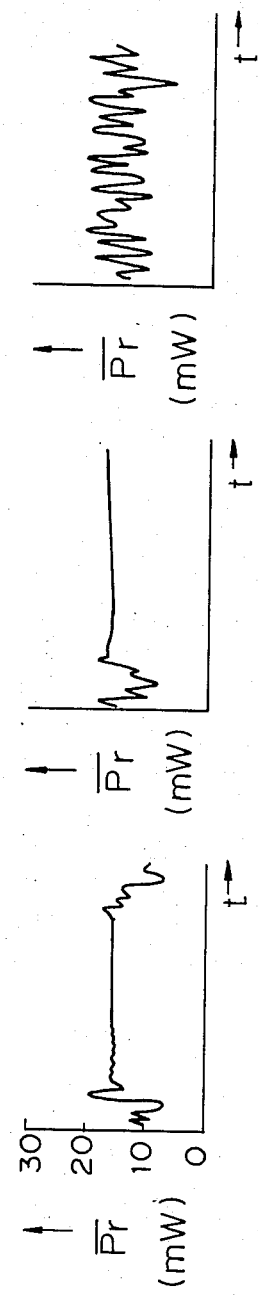
FIG. 30C depicts graphs of electromagnetic powers in dBm and mW detected when a mixed layer of coke and ore continues descending for a long term in a furnace.
Figure 31A:
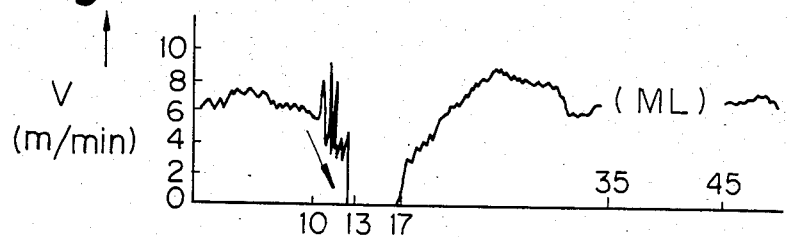
FIGS. 31A, 31B, 31C, 31D, and 31E are graphs of data regarding descending speed, layer thickness, and particle size of burdens obtained using the detection unit in FIGS. 28A through 28C.
Figure 31B:
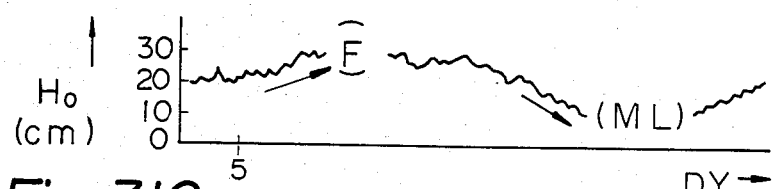
Figure 31C:
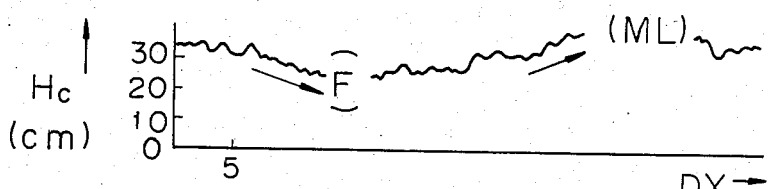
Figure 31D:
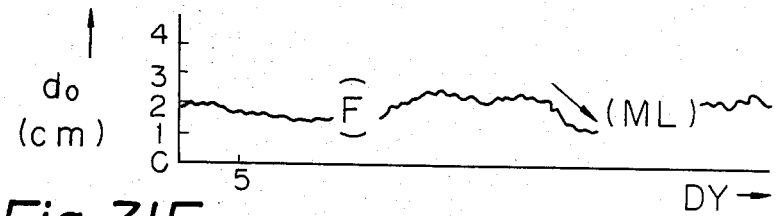
Figure 31E:
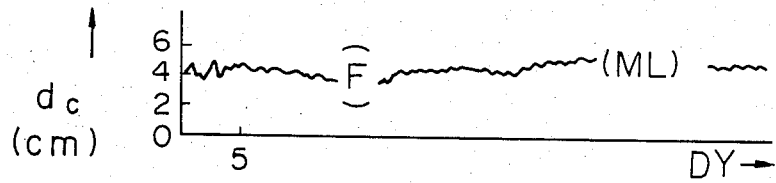

FIG. 30A depicts graphs of power in dBm and mW detected when the coke layer stops descending for a long time in the furnace. FIG. 30B depicts graphs of power in dBm and mW detected when the ore layer stops descending for a long time in the furnace. FIG. 30C depicts graphs of power in dBm and mW detected when a mixed layer of coke and ore continues descending for a long time in the furnace. In this case, the detection signals of the scattered electromagnetic wave and the transmitted electromagnetic wave, shown respectively in FIGS. 30A and 30B, do not vary due to the stop of descent. The power of the electromagnetic wave scattered by the mixed layer of ore and coke exhibits a middle level between the levels of the signals shown in FIGS. 30A and 30B. Also, the signal of the electromagnetic wave scattered by the mixture contains high frequency ripple.

FIGS. 31A, 31B, 31C, 31D, and 31E are graphs of data regarding the descending velocity, the thickness of the layer, and the particle size of the burdens obtained by using the detection unit 120 shown in FIGS. 28A through 28C. The data of FIG. 31 were collected through long-term measurements, and therefore, the abscissa of each graph indicates the term in days (DY). As seen from FIGS. 31B and 31C, the thickness $H_o$ of the ore layer starts increasing after five days, while the thickness $H_c$ of the coke layer starts decreasing after five days from the beginning of measurement. As seen from FIG. 31A, the descending velocity V irregularly varies after 10 days and thereafter decreases gradually. In the graphs, regions F represent terms where the charges do not fall smoothly in the furnace. Therefore, it was impossible to obtain data regarding the velocity V, thicknesses $H_o$ and $H_c$, the particle size $d_o$ of ore particles, and the particle size $d_c$ of coke particles. It may be considered that the burdens, located in front of the unit 120, did not move in the furnace in the 13th through 17th days from the beginning of the measurements. In the graphs, characters ML denote the mixed layer of ore and coke. The mixed layer ML continues for a five-day period from the 35th to 45th day. As seen from FIGS. 31B to 31E, during the few days preceding the above term of the mixed layer ML, the average ore particle sizes $d_o$ gradually decreased, the ore thicknesses $H_o$ gradually decreased, and the coke-thickness $H_c$ gradually increased. This means that the ore layer penetrated into the coke layer located therebeneath, so that a layer composed of mainly coke became the mixed layer ML.

Figure 32A:
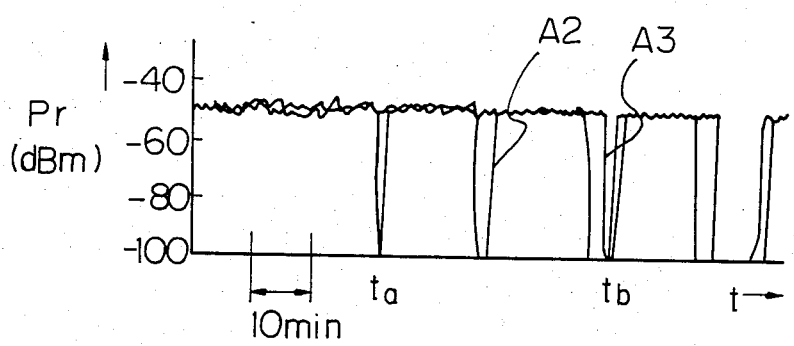
FIGS. 32A and 32B depict graphs exhibiting the electromagnetic power of the detection signal in dBm and mW, obtained by using the detection unit 120 shown in FIGS. 28A through 28C.
Figure 32B:
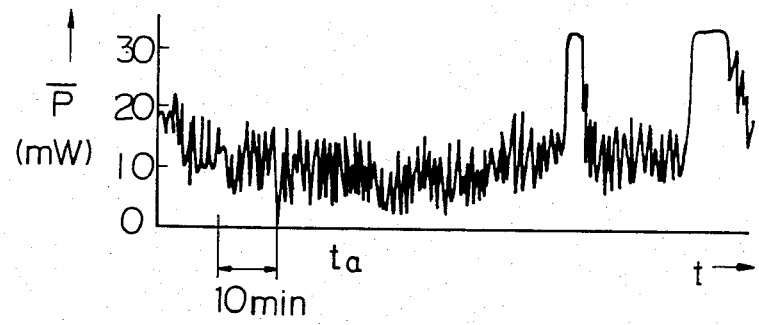

FIGS. 32A and 32B are graphs exhibiting the power of the detection signal in dBm and mW, obtained by measuring the thickness and the descending velocity of the cohesive layer using the detection unit 120 shown in FIGS. 28A to 28C. The power of this example is measured in a case where the detection unit 120 is mounted to the boths BH, of the furnace. The power $P_r$ of FIG. 32A is obtained from the scattered electromagnetic wave, but the power $P_r$ of FIG. 32B is obtained from the reflected electromagnetic wave. In FIG. 32A, before the time $t_a$, since the cohesive zone is located above the unit 120, a signal relating only to the coke layer is measured. Next, at the time $t_a$, since the the cohesive layer faces the open end A2, the signal level is reduced to $-100$ dBm, in which no electromagnetic wave is detected. Thus, the existence of the cohesive layer at the end A2 can be known. During the term between $t_a$ and $t_b$, the signal relating to the cohesive layer cannot be detected via the open end A3, because the cohesive layer is descending in level between the open ends A2 and A1. This means, the bottom of the cohesive layer is now located between the open ends A1 and A2. Further, after the time $t_b$, since the cohesive layer is located below the level of the open end A1, the descending velocity, the thickness, and the coke particle size of the cohesive zone can be measured. In the example, after the time $t_b$, the descending velocity of the cohesive layer is 3 m/hr, the average thickness thereof is 20 cm, and the average particle size thereof is 4 cm. The latter half of FIG. 32B reveals the fact that the detection signal ($P_r$) has a high power and the fluctuation thereof is minimized. Furthermore, it will be possible to estimate the location of the lower edge of the cohesive zone layer by using the reduction rate of the thicknesses $H_{CL}$'s which are detected by two open ends A2 and A3.

As explained in detail, the present invention makes it possible to supervise various kinds of conditions, characteristics, or natures inside a blast furnace with a very high degree of accuracy.

We claim:

1. A method for supervising charges in a blast furnace, comprising the steps of;

radiating microwave radiation into said charges composed of alternating layers of at least ore and coke the wavelength of which radiation is substantially the same as the particle size of each charge;

receiving and detecting the microwave radiation which is reflected or scattered by the charge or transmitted through the charge; and analyzing the detected microwave radiation so as to distinguish ore and coke based on the reflection or scattering of the microwave radiation by the ore and the transmission of the microwave radiation through the coke.

2. A method as set forth in claim 1, wherein the step of radiating comprises the step of radiating with an microwave radiation having a wavelength in a range of 0.6–6.0 cm corresponding to a frequency range of 5–50 GHz.

3. In a blast furnace arrangement of processing charges including ore and coke, the arrangement including first and second detection units, each detection unit including at least one waveguide and at least one antenna coupled to the waveguide at an open end thereof positioned inside the blast furnace, the waveguide and the antenna being cooled by a cooling arrangement wherein an inert gas is blown through the waveguide from outside the blast furnace to an open end of said antenna, the detection unit including a transmitting unit for radiating microwave radiation and a receiving unit for receiving the microwave radiation radiated from said transmitting unit and reflected or scattered by ore or transmitted through the coke, the first detection unit being positioned along a longitudinal axis of said blast furnace at a predetermined distance L higher than said second unit, a method of supervising the charges comprising the steps of:

radiating microwave radiation into charges composed of alternating layers of at least ore and coke, the wavelength of the microwave radiation being substantially the same as the particle size of the charges;

receiving and detecting microwave radiation reflected or scattered by the charges or transmitted therethrough; and;

analyzing the detected microwave radiation so as to distinguish ore and coke based on the reflection or scattering of the microwave radiation by the ore and the transmission of the microwave radiation through the coke, the analyzing including determining a descending time T, a descending velocity V, a thickness H, and a particle size D derived from two sets of data regarding powers of both a first received microwave radiation, which data are obtained in time series by the first and second detection units.

4. A method as set forth in claim 3, wherein said descending time T is derived, first, by calculating a cross-correlation function $\rho(\tau)$, defined as $$\rho(\tau) = \frac{1}{t_0} \int_{t-t_0}^{t} S_1(t) \cdot S_2(t-\tau)dt,$$

second, varying a shift time $\tau$ until the value of $\rho(\tau)$ reaches its maximum and whereby the thus obtained $\tau$ expresses the descending time T, in which $S_1(t)$ and $S_2(t)$ denote detection signals representing powers of said first and second received microwave radiation, respectively, and $t_0$ denotes a predetermined constant time selected to be far longer than a usual time required for a defined portion of charge to move from said first detection unit to said second detection unit.

5. A method as set forth in claim 3, wherein said descending time T is derived from times required for passing the boundary between coke and ore layer from said first detection unit to said second detection unit, which distance is set shorter than layer thicknesses obtained statistically.

6. A method as set forth in claim 3, wherein said descending velocity V is calculated by using an expression $$V = L/T.$$

7. A method as set forth in claim 4, wherein the thickness $H_c$ of the core layer and the thickness $H_o$ of the ore layer are calculated respectively by using expressions:

$$H_c = T_c \times V$$

$$H_o = T_o \times V$$

where $T_c$ and $T_o$ denote times required for passing through at least either one of the first and second detection units, respectively.

8. A method as set forth in claim 6, wherein the thickness $H_c$ of the core layer and the thickness $H_o$ of the ore layer are calculated respectively by using expressions:

$$H_c = T_c \times V$$

$$H_o = T_o \times V$$

where $T_c$ and $T_o$ denote times required for passing through at least either one of the first and second detection units, respectively.

9. A method as set forth in claim 4, wherein said particle size d is calculated by using an expression:

$$d = \Delta tp \times V$$

where at least either one of said first and second detection units radiates from its transmitting part the microwave radiation and receives at its receiving part the radiated microwave radiation reflected by each particle of said charges, thereby creating a pulse train signal composed of successive peaks of the detection signal relating to the received microwave radiation, and thereby the time $\Delta tp$ is determined as the pulse period of the pulse train signal, the wavelength of the microwave radiation preferably selected to be approximate to the average particle size.

10. A method as set forth in claim 3, wherein said descending time T, descending velocity V, thickness H, and particle size d regarding a layer of a cohesive ore are derived from two sets of data regarding powers of both said first received microwave radiation and said second received microwave radiation, which data are obtained in time series by said first and second detection units which are mounted to a bosh of the blast furnace.

11. An apparatus for supervising charges in a blast furnace, including at least one detection unit, the detection unit comprising both a transmitting unit for radiating microwave radiation to the charges in the blast furnace the wavelength of which is substantially the same as the particle size of each charge and a receiving unit for receiving the microwave radiation reflected or scattered by the charges or transmitted through the burdens, the transmitting unit having a transmitter, outside the blast furnace, the receiving part having a receiver, outside the blast furnace.

12. An apparatus as set forth in claim 11, wherein said transmitting unit has a waveguide provided with said transmitter at one end outside the furnace and said receiving unit has a waveguide provided with said receiver at one end outside the furnace; each of these waveguides is positioned within a cooling means; each of these waveguides having an inlet, outside the furnace, for blowing inert gas through the waveguide to an open end thereof and into the furnace.

13. An apparatus as set forth in claim 12, wherein the open end, inside the furnace, of each said waveguide is coupled with an antenna.

14. An apparatus as set forth in claim 13, wherein the open end of the antenna is narrower than that of said waveguide to be coupled therewith; further, the open end of the antenna is slender and extends in a direction perpendicular to a direction of an electric field created inside the waveguide.

15. An apparatus as set forth in claim 13, wherein said antenna is of a horn type.

16. An apparatus as set forth in claim 13, wherein said antenna is integral with the open end, inside the furnace, of said waveguide; further, a plurality of slits are formed at the open end, each slit being slender and extending in a direction perpendicular to a direction of an electric field created inside the waveguide.

17. An apparatus as set forth in claim 13, wherein the open end of said antenna is covered by a metal mesh or a metal grating.

18. An apparatus as set forth in claim 13, wherein said antenna of said transmitting unit and said antenna of said receiving unit are aligned on the same horizontal plane parallel to a lateral axis of said blast furnace as to face each other at a specific distance therebetween.

19. An apparatus as set forth in claim 18, wherein a first detection unit and a second detection unit are located along a longitudinal axis of said furnace at a predetermined distance.

20. An apparatus as set forth in claim 13, wherein said transmitting and receiving units are constructed in one body.

21. An apparatus as set forth in claim 20, wherein both said antenna and waveguide of said transmitting unit are common to both said antenna and waveguide of said receiving unit; both said transmitter and receiver are connected, outside the furnace, to the end of the common waveguide, which receiver is coupled thereto via a directional coupler.

22. An apparatus as set forth in claim 21, wherein one said detection unit and another said detection unit, as first and second detection units, respectively, are mounted to the furnace wall and arranged in a direction along the longitudinal axis of said blast furnace at a predetermined distance L.

23. An apparatus as set forth in claim 13, wherein both said transmitting unit and receiving unit are contained within the body of said detection unit.

24. An apparatus as set forth in claim 21, wherein a first said transmitting and receiving unit and second said transmitting and receiving unit are arranged in a direction along the longitudinal axis of said blast furnace.

25. An apparatus as set forth in claim 23, wherein said antenna of said transmitting unit and said antenna of said receiving unit are positioned on the same plane.

26. An apparatus as set forth in claim 25, wherein both said antennas are arranged in a direction perpendicular to the lateral axis of said blast furnace.

27. An apparatus as set forth in claim 26, wherein a first said detection unit and a second said detection unit are arranged in a direction of the longitudinal axis of the blast furnace at a predetermined distance L.

28. An apparatus as set forth in claim 23, wherein said transmitting unit and said receiving unit are substantially composed of three portions, the first portion at least producing the microwave radiation, the second and third portions receiving the thus produced microwave radiation.

29. An apparatus as set forth in claim 28, wherein said first portion also receives the microwave radiation and is provided with both a transmitter and receiver, the receiver being coupled to said waveguide by way of a directional coupler.

30. An apparatus as set forth in claim 28, wherein said first portion is located on an opposite side of a longitudinal axis of the blast furnace to said second and third portions.

31. An apparatus as set forth in claim 30, wherein said second and third portions are located laterally above and below said first portion, respectively.

32. An apparatus as set forth in claim 29, wherein said antenna of said first portion is directed opposite from said antennae of said second and third portions along the lateral axis of the blast furnace.

33. In a blast furnace arrangement for processing charges including ore and coke, the arrangement including a detection unit having a part located inside said blast furnace and another part located outside said blast furnace, the detection unit including a transmitting unit for radiating an microwave radiation radiated from said transmitting unit and reflected or scattered by ore or transmitted through the coke, a method of supervising the charges, comprising the steps of:
radiating microwave radiation into charges composed of alternating layers of at least ore and coke, the wavelength of said microwave radiation being substantially the same as the particle size of the charges;
receiving and detecting microwave radiation reflected or scattered by the charges or transmitted through the burdens; and
analyzing the detected microwave radiation so as to distinguish ore and coke based on the reflection or scattering of the microwave radiation by the ore and the transmission of the microwave radiation through the coke.

34. In a blast furnace arrangement for processing charges including ore and coke, the arrangement including a detection unit including at least one waveguide and at least one antenna coupled to the waveguide at an open end thereof positioned inside the blast furnace, the waveguide and the antenna being cooled by a cooling arrangement wherein an inert gas is blown through the waveguide from outside the blast furnace to an open end of said antenna, the detection unit including a transmitting unit for radiating microwave radiation and a receiving unit for receiving microwave radiation radiated from said transmitting unit and reflected or scattered by ore or transmitting through the coke, a method of supervising the charges, comprising the steps of:
radiating microwave radiation into charges composed of alternating layers of at least ore and coke, the wavelength of the microwave radiation being substantially the same as the particle size of the charges;
receiving and detecting the microwave radiation reflected or scattered by the charges or transmitted therethrough; and
analyzing the detected microwave radiation so as to distinguish ore and coke based on the reflection or scattering of the microwave radiation by the ore and the transmission of the microwave radiation through the coke.

* * * * *